(12) United States Patent
Bergquist et al.

(10) Patent No.: US 9,019,882 B2
(45) Date of Patent: Apr. 28, 2015

(54) APPARATUSES AND METHODS FOR MANAGING PENDING HARQ RETRANSMISSIONS

(71) Applicant: Telefonaktiebolaget L M Ericsson (publ), Stockholm (SE)

(72) Inventors: Gunnar Bergquist, Kista (SE); Riikka Susitaival, Helsinki (FI); Anders Ohlsson, Järfälla (SE); Mikael Wittberg, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 203 days.

(21) Appl. No.: 13/825,462

(22) PCT Filed: Nov. 9, 2012

(86) PCT No.: PCT/SE2012/051225
§ 371 (c)(1),
(2) Date: Mar. 21, 2013

(87) PCT Pub. No.: WO2013/172756
PCT Pub. Date: Nov. 21, 2013

(65) Prior Publication Data
US 2014/0071868 A1    Mar. 13, 2014

Related U.S. Application Data

(60) Provisional application No. 61/646,757, filed on May 14, 2012.

(51) Int. Cl.
*H04W 76/04* (2009.01)
*H04L 1/18* (2006.01)

(52) U.S. Cl.
CPC .......... *H04W 76/048* (2013.01); *H04L 1/1864* (2013.01); *H04L 1/1896* (2013.01); *H04L 1/1803* (2013.01)

(58) Field of Classification Search
CPC . H04W 76/048; H04L 1/1864; H04L 1/1896; H04L 1/1803
USPC .................................................. 370/311, 251
See application file for complete search history.

(56) References Cited

U.S. PATENT DOCUMENTS

2010/0070816 A1*  3/2010  Park et al. ............... 714/748
2012/0113941 A1   5/2012  Chung et al.
(Continued)

FOREIGN PATENT DOCUMENTS

WO    WO 2009/064059 A1    5/2009

OTHER PUBLICATIONS

3GPP TS 36.321, v10.5.0, Mar. 2012, 3rd Generation Partnership Project; Technical Specification Group Radio Access Network; Evolved Universal Terrestrial Radio Access (E-UTRA); Medium Access Control (MAC) protocol specification (Release 10); 25 Pages.

(Continued)

*Primary Examiner* — Albert T Chou
(74) *Attorney, Agent, or Firm* — Myers Bigel Sibley & Sajovec, P.A.

(57) ABSTRACT

Methods and systems present solutions to, for example, the problem of unnecessary preparedness for suspended retransmissions in the user equipment (UE) which contributes to power drain in the device battery. One method for monitoring a Physical Downlink Control Channel (PDCCH) for adaptive retransmission grants in a radio communication system includes: monitoring, by a user equipment (UE), the PDCCH for adaptive retransmission grants; receiving, by the UE, a hybrid automatic repeat request (HARQ) acknowledge (ACK) message, and ceasing, by the UE, to monitor the PDCCH for adaptive retransmission grants after receipt of the HARQ ACK message.

27 Claims, 15 Drawing Sheets

(56) References Cited

U.S. PATENT DOCUMENTS

2012/0250551 A1* 10/2012 Sartori et al. ............... 370/252
2012/0314637 A1* 12/2012 Kim et al. .................. 370/311

OTHER PUBLICATIONS

ASUSTeK, "Active time for a pending HARQ retransmission", 3GPP TSG-RAN2 Meeting #64bis, R2-090120, Ljubljana, Slovenia, Jan. 12-16, 2009, 4 Pages.

Ericsson, Nokia Siemens Networks, "Clarifications and Corrections of DL and UL Data Transfer (SCH, RACH and SR)", 3GPP TSG-RAN2 Meeting #63, R2-084875 (R2-084757), Jeju Island, Korea, Aug. 18-22, 2008, 13 Pages.

Nokia Siemens Networks, Ericsson, "DRX and UL Retransmissions", 3GPP TSG-RAN2 Meeting #65, R2-090973, Athens, Greece, Feb. 9-13, 2009; 3 Pages.

International Search Report, PCT Application No. PCT/SE2012/051225, Jan. 30, 2013.

Written Opinion of the International Searching Authority, PCT Application No. PCT/SE2012/051225, Jan. 30, 2013.

* cited by examiner

| SUBFRAME COUNT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| ACTION | SPS GRANT | | | | UL TX | | | | HARQ ACK | | | | | | | | R-TX GRANT | | | |
| DRX ACTIVE TIME | | | | | | | | | ///~55 | | | | | | | | ///~56 | | | |

| SUBFRAME COUNT | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| ACTION | | | | | R-TX GRANT | | | | | | | | R-TX GRANT | | | | | | | |
| DRX ACTIVE TIME | | | | | ///~58 | | | | | | | | ///~60 | | | | | | | |

| SUBFRAME COUNT | 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|---|
| ACTION | SPS GRANT | | | | UL TX | | | | HARQ ACK | | | | | | | | R-TX GRANT | | | |
| DRX ACTIVE TIME | | | | | | | | | /// | | | | | | | | /// | | | |

FIG. 6

| SUBFRAME COUNT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| ACTION | SPS GRANT, R-TX GRANT | | | | UL TX, R-TX GRANT | | | | HARQ ACK | | | | R-TX GRANT | | | | R-TX GRANT | | | |
| DRX ACTIVE TIME | ///  | | | | /// | | | | /// | | | | /// | | | | /// | | | |
| HARQ PROCESS | 0 —62 | | | | 1 —64 | | | | 0 —66 | | | | 1 —68 | | | | 0 —70 | | | |

| SUBFRAME COUNT | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| ACTION | SPS GRANT, R-TX GRANT | | | | UL TX, R-TX GRANT | | | | HARQ ACK | | | | R-TX GRANT | | | | R-TX GRANT | | | |
| DRX ACTIVE TIME | /// | | | | /// | | | | /// | | | | /// | | | | /// | | | |
| HARQ PROCESS | 1 | | | | 0 | | | | 1 | | | | 0 | | | | 1 | | | |

| SUBFRAME COUNT | 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|---|
| ACTION | SPS GRANT, R-TX GRANT | | | | UL TX, R-TX GRANT | | | | HARQ ACK | | | | R-TX GRANT | | | | R-TX GRANT | | | |
| DRX ACTIVE TIME | /// | | | | /// | | | | /// | | | | /// | | | | /// | | | |
| HARQ PROCESS | 0 | | | | 1 | | | | 0 | | | | 1 | | | | 0 | | | |

FIG. 7

| SUBFRAME COUNT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| ACTION | SPS GRANT | | | | UL TX | | | | | | | | | | | | | | | |
| DRX ACTIVE TIME | | | | | | | | | HARQ ACK | | | | | | | | | | | |
| SUBFRAME COUNT | 20 | 21 | 22 | 23 | 24 | 25 | 26 | 27 | 28 | 29 | 30 | 31 | 32 | 33 | 34 | 35 | 36 | 37 | 38 | 39 |
| ACTION | | | | | | | | | | ~72 | | | | | | | | | | |
| DRX ACTIVE TIME | | | | | | | | | | | | | | | | | | | | |
| SUBFRAME COUNT | 40 | 41 | 42 | 43 | 44 | 45 | 46 | 47 | 48 | 49 | 50 | 51 | 52 | 53 | 54 | 55 | 56 | 57 | 58 | 59 |
| ACTION | SPS GRANT | | | | UL TX | | | | | | | | | | | | | | | |
| DRX ACTIVE TIME | | | | | | | | | HARQ ACK | | | | | | | | | | | |

FIG. 8

| SUBFRAME COUNT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| ACTION | SPS GRANT | | | | UL TX | | | | HARQ ACK | | | | | | | | | | | |
| DRX ACTIVE TIME | | | | | | | | | | 74 | | | | | | | | | | |
| SUBFRAME COUNT | 20 | 21 | 22 | 23 | 24 | 25 | 26 | 27 | 28 | 29 | 30 | 31 | 32 | 33 | 34 | 35 | 36 | 37 | 38 | 39 |
| ACTION | SPS GRANT | | | | UL TX | | | | HARQ ACK | | | | | | | | | | | |
| DRX ACTIVE TIME | | | | | | | | | | | | | | | | | | | | |
| SUBFRAME COUNT | 40 | 41 | 42 | 43 | 44 | 45 | 46 | 47 | 48 | 49 | 50 | 51 | 52 | 53 | 54 | 55 | 56 | 57 | 58 | 59 |
| ACTION | SPS GRANT | | | | UL TX | | | | HARQ ACK | | | | | | | | | | | |
| DRX ACTIVE TIME | | | | | | | | | | | | | | | | | | | | |

FIG. 9

TRANSMITTING, BY AN NETWORK NODE, A MESSAGE WHICH INSTRUCTS A USER EQUIPMENT TO CEASE MONITORING THE PDCCH AFTER RECEIPT OF A HYBRID AUTOMATIC REPEAT REQUEST (HARQ) ACKNOWLEDGE (ACK) MESSAGE —300

FIG. 13

APPARATUSES AND METHODS FOR MANAGING PENDING HARQ RETRANSMISSIONS

CROSS REFERENCE TO RELATED APPLICATIONS

This application is a 35 U.S.C. §371 national stage application of PCT International Application No. PCT/SE2012/051225, filed on 9 Nov. 2012, which itself claims the benefit of U.S. provisional Patent Application No. 61/646,757, filed 14 May 2012, the disclosures and contents of both of which are incorporated by reference herein in their entirety.

TECHNICAL FIELD

The present disclosure generally relates to apparatuses and methods for radio communications and, more specifically, to Hybrid Automatic Repeat reQuest (HARQ) and Discontinuous Reception (DRX) algorithms.

BACKGROUND

In the last years, mobile devices have become ubiquitous, applications for these mobile devices have flooded the market, and clients' expectations for omnipresent high quality service have challenged the network service providers. Among other things, users expect services to be delivered with high quality, and some services require high quality in the radio communications in order to be perceived by users as being delivered satisfactorily. Unfortunately, in a radio environment, there will be situations where some, e.g., data packets, are not received properly by a user's equipment and, in such cases, it may be necessary to retransmit those data packets in order to provide an appropriate level of service.

The telecommunications industry has used the Automatic Repeat reQuest (ARQ) layer 2 protocol for many years as a retransmission mechanism to ensure that data is sent reliably from one node to another. More recently, certain standards, such as the Third Generation Partnership Project (3GPP) Long Term Evolution (LTE) standard, have taken advantage of a Hybrid ARQ (HARQ) process to counteract errors. See FIG. 1 and FIG. 2 for the illustrations of the Layer 2 architecture used in LTE.

FIG. 1 shows the Layer 2 architecture for downlink (DL) 2 used in LTE and includes the Packet Data Convergence Protocol (PDCP) sublayer 4, the Radio Link Control (RLC) sublayer 6 and the Medium Access Control (MAC) sublayer 8. The PDCP layer 4 includes a plurality of Robust Header Compression (ROHC) functions 10 each of which has its own security function 12 which can perform, for example, ciphering. The RLC sublayer 6 can perform error correction through ARQ and re-segmentation as shown in function blocks 14. The MAC sublayer 8 can include a scheduling and priority handling function 16, perform multiplexing/demultiplexing of data as shown in blocks 18 and 20. Additionally, error correction through HARQ 22 can also be performed. The Layer 2 architecture for DL 2 also includes control channels such as a Broadcast Control Channel (BCCH) 24, a Common Control Channel (CCCH) 26 and a Paging Control Channel (PCCH) 28.

FIG. 2 shows the Layer 2 architecture for uplink (UL) 30 used in LTE which is similar to the architecture described above with respect to FIG. 1, i.e., FIG. 2 includes some of the same type of functions designed for use in the UL. For more information regarding these Layer 2 architectures the interested reader is directed to 3GPP TS 36.300 V11.3.0 (2012-09).

HARQ involves an encoded forward link for error correction and detection, and a feedback link for possible retransmission. At the transmitter, parity bits are added to a data block which is to be transmitted, the parity bits serving to facilitate detection and correction of errors. In case the receiver is not able to correct these errors, the data block is transmitted again. For each received data block the receiver either sends a positive acknowledgment ("ACK") (data block is received or decoded successfully) or a negative acknowledgement ("NACK") (data block is undecodable). The transmitter responds to a NACK by re-transmitting the information.

HARQ is a stop-and-wait protocol. Being a stop-and-wait protocol, (re)transmissions are restricted to occur at known time instants, in between which the sender stops and waits for ACK/NACK feedback from the receiver. As used herein, "feedback", and particularly HARQ feedback, includes both feedback of a positive acknowledgement ("ACK") and feedback of negative acknowledgement ("NACK"). Thus, subsequent transmission of new data can take place only after waiting to receive ACK/NACK from the receiving entity. In case an ACK is received a new transmission occurs, otherwise a retransmission occurs. This scheme can be improved by using multiple channels for supporting HARQ service. The HARQ receiver must transmit either ACK or NACK, still of course there is the possibility that the sender detects neither. This is referred to as detection of a Discontinuous Transmission (DTX). There are two possible reasons for a DTX detection to occur, either the data was lost or the forward transmission was lost and not detected by the receiver.

When the HARQ transmitter has reached the maximum number of retransmissions for a transport block without getting an ACK, the HARQ transmitter will stop transmitting and let a higher layer ARQ take over, if any such higher layer ARQ exists. Examples of such higher layers that engage ARQ are the Radio Link Control (RLC), 3GPP TS 36.322 V11.0.0 (2012-09), and the Transmission Control Protocol (TCP), RFC 2581 (1999-04).

The standards document 3GPP TS 36.300, Evolved Universal Terrestrial Radio Access (E-UTRA) and Evolved Universal Terrestrial Radio Access Network (E-UTRAN); Overall description; Stage 2, version 11.3.0, sub-clause 9.1 explains some of the principles of LTE HARQ used by 3GPP. For LTE HARQ, there are several channels of interest, including the Physical Uplink Control Channel (PUCCH); the Physical Uplink Shared Channel (PUSCH); the Physical Downlink Control Channel (PDCCH); and, the Physical Hybrid ARQ Indicator Channel (PHICH).

For the UL, i.e., for transmissions in the UL from a user equipment (UE) to the base station, the LTE HARQ is a Synchronous HARQ. There is a maximum number of retransmissions configured per UE (as opposed to per radio bearer) with RRC parametermaxHARQ-Tx. Downlink ACK/NACKs in response to uplink (re)transmissions are sent on the PHICH. The radio channel may act in an obstructive way such that ACK can be received as NACK and vice versa. The PHICH can also be totally obscured in such a way that the peer receiver detects DTX.

In general, HARQ operation on the UL is governed by the following basic principles. A first UL HARQ operation principle is that, regardless of the content of the received HARQ feedback (ACK, NACK or DTX), when a PDCCH for the UE is correctly received, the UE follows what the PDCCH asks the UE to do, e.g., the UE performs a transmission or a retransmission (referred to as adaptive retransmission). A second UL HARQ operation principle is that, when no PDCCH addressed to the Cell Radio Network Temporary Identifier (C-RNTI) of the UE is detected, the HARQ feedback on PHICH dictates how the UE performs retransmissions. If the HARQ feedback to the UE is either NACK or DTX, the UE performs a non-adaptive retransmission, i.e., a retransmission on the same uplink resource as previously used by the same process. If the HARQ feedback to the UE is an ACK, the UE does not perform any UL (re)transmission but still keeps the data in a buffer known as the HARQ buffer. The PDCCH can then be used to perform a retransmission, but a non-adaptive retransmission cannot follow.

3GPP TS 36.321, Evolved Universal Terrestrial Radio Access (E-UTRA); Medium Access Control (MAC) protocol specification, Medium Access Control (MAC) protocol specification, version 11.0.0, sub-clause 5.4.2, specifies the HARQ transmitter operation of the E-UTRAN UE as a set of sub layer procedures of layer 2. According to this standards specification and sub-clause, an identified HARQ process of the UE (HARQ transmitter over the Uplink Shared Channel [UL-SCH]) is instructed to generate an adaptive retransmission if an uplink grant is detected, and otherwise to generate a non-adaptive retransmission.

3GPP TS 36.321 specifies in different sub-clauses three different conditions that each by itself will clear any pending HARQ retransmission in a UE. Each is associated to an explicit flush of the HARQ buffer, which effectively clears any pending retransmissions. More specifically:

Sub-clause 5.2. The UE is not allowed to transmit when it is not synchronized to the reception timing used by the base station; the UE will flush the HARQ buffer at expiry of the timer supervising time alignment (timeAlignmentTimer);

Sub-clause 5.4.2.2. The HARQ persistency are brought to an end when the maximum number of transmissions is reached; the UE will flush the HARQ buffer when the variable CURRENT_TX_NB=maximum number of transmissions−1; and Sub-clause 5.9. The MAC layer in UE will reset if requested by higher layers; all timers are stopped, all variables reset and all buffers are flushed.

In addition, 3GPP TS 36.321 specifies in sub-clause 5.4.2.2 one condition that will postpone any pending HARQ retransmission. It is summarized in the following note. NOTE: When receiving a HARQ ACK alone, the UE keeps the data in the HARQ buffer. Such a postponed HARQ retransmission is always an adaptive retransmission, i.e., its occurrence is explicitly controlled by an eNodeB and the UE must conclude indication of an uplink grant for the associated HARQ process.

There are certain conventional scenarios which benefit from the postponing of HARQ retransmissions, e.g., when some parallel procedures occur. For example, Change Request (CR) 5 on 36.321 in 3GPP R2-084875 made it clear that measurement gaps have high priority. The UE will not perform UL transmissions based on an UL grant in such a gap. This is one scenario where an eNodeB may not yet have successfully received some UL transmission but decides to postpone all associated HARQ retransmissions in the UE. This can be done sending HARQ ACK before the measurement gap.

The same CR also made it clear that random access has higher priority, even higher priority than measurement gaps. This is another scenario where an eNodeB may not yet have successfully received some UL transmission but decides to postpone all associated HARQ retransmission in the UE, e.g., the network may want to give priority to a Msg3 over HARQ retransmission. A Msg3 is a message transmitted on the UL-SCH containing a C-RNTI MAC Control Element (CE) or a Common Control Channel (CCH) Service Data Unit (SDU), submitted from an upper layer and associated with the UE contention resolution identity, as part of a random access procedure.

There are other scenarios which benefit from the postponement of HARQ retransmissions in the UL, e.g., when an eNodeB experiences congestion on PDCCH, PDSCH or PUSCH. In a high network load scenario, the processing capability decreases as traffic grows closer to system capacity limits. In this case, the network elements will benefit from the possibility to ease the load by postponing some retransmissions.

NACK-to-ACK errors are another reason why it is useful to be able to perform HARQ retransmissions instead of stopping them after HARQ ACK. The radio quality gets worse as UE moves close to the cell border. Not only does the occurrence of NACK increase but also the probability of NACK-to-ACK error. In the case of NACK-to-ACK error, the UE does not perform non-adaptive retransmission even though it is instructed to do so. The network can detect missing UL retransmission and trigger adaptive retransmission one HARQ RTT later. Thus, there are good reasons why ACK alone shall not always unconditionally flush the HARQ buffer.

Turning now to the topic of discontinuous reception (DRX), the "always-on" type of behavior that is arriving with smartphones adds much strain on the battery economy in the UE. There are different methods in LTE to limit the power consumption in the UE, one such method being DRX.

DRX can be applied both in RRC_IDLE and in RRC_CONNECTED states. The principles are the same. The description hereafter applies to DRX during RRC_CONNECTED which is the relevant state for the abovementioned "always-on" type of behavior.

DRX is a method to reduce battery consumption in the UE by allowing the UE to stop monitoring the PDCCH, i.e., it can turn off the receiver during short and even lengthy times and just discontinuously listen during shorter so called on-duration phases, the occurrence of which are known to both sides of the protocol. The time periods where the UE is allowed to turn off the receiver are configured by the network and acknowledged by the UE. The reoccurring periods of the on-duration phase is illustrated in FIG. 3.

For example, as shown in FIG. 3, there is a DRX Cycle 32 which includes an On Duration Time 34, which is when the UE monitors the PDCCH, and an opportunity for DRX 36, i.e., a time when the UE can turn off its receiver.

FIG. 4 illustrates the LTE state model and the denotations used in this description. For example, FIG. 4 shows the transition paths between RRC_IDLE state 38 and RRC_CONNECTED state 40 and furthermore the DRX transitions between sub-states (Continuous/Active sub-state 42, Short DRX sub-state 44 and Long DRX sub-state 46) while in the RRC_CONNECTED state 40. FIG. 4 also shows the conventional view of energy and latency associated to the states and sub-states of LTE which is that the more power that is used by the device modem, the faster it will respond to data communication. Staying in the Continuous/Active sub-state 42 is better for having a more immediate connection than staying in the lower DRX sub-states 44 and 46. Staying in the Short DRX sub-state 44 in turn provides better responsiveness than staying in the Long DRX sub-state 46. Staying in the RRC_CONNECTED state 40 in turn results in faster reaction (better latency) than staying in the RRC_IDLE state 38. FIG. 4 also illustrates how the energy consumed by the device will change and suggests that the battery lifetime is shortest when staying all the time in Continuous/Active sub-state 42 of the RRC_CONNECTED state 40.

DRX involves the use of timers to supervise active reception time. The 3GPP TS 36.321, chapter 3 and chapter 5, sub-clause 5.7 specifies the drx-InactivityTimer (denoted T1 in FIG. 4) to be the number of consecutive downlink subframe(s) during which the UE shall monitor the PDCCH after successfully decoding a PDCCH indicating an initial UL or DL user data transmission for this UE.

3GPP TS 36.321 also specifies drxShortCycleTimer (denoted T2 in FIG. 4) to be the number of consecutive subframe(s) the UE shall follow the short DRX cycle after the drx-InactivityTimer has expired. FIG. 5 is an illustration of the sub-state transitions following upon inactivity.

As shown in FIG. 5, the UE will start the drx-InactivityTimer 48 each time it terminates and decodes a PDCCH indicating new transmission. It will then continue to monitor PDCCH as long as the timer is running, i.e., the drx-InactivityTimer 48 will keep the UE from falling asleep. After the drx-InactivityTimer 48 has expired the drxShortCycleTimer 50 is started to supervise a switch to the next lower DRX sub-state using Long DRX cycles 52. The Short DRX cycles 54 are typically much shorter than the Long DRX cycles 52.

The concept of "Active Time" is also used in DRX. 3GPP TS 36.321, version 11.0.0, chapter 5, subclause 5.7, defines the Active Time as the aggregated phases while either:
- on DurationTimer or drx-InactivityTimer or drx-RetransmissionTimer (used to supervise any DL retransmission that UE expects) or mac-ContentionResolutionTimer (used to supervise the completion of random access) is running; or
- a Scheduling Request for UL transmission is sent on PUCCH and is pending (no grant for UL transmission has yet been received); or
- an uplink grant for a pending HARQ retransmission can occur and there is data in the corresponding HARQ buffer; or
- a PDCCH indicating a new transmission addressed to the C-RNTI of the UE has not been received after successful reception of a Random Access Response for the preamble not selected by the UE.

In particular, 3GPP TS 36.321, subclause 5.7, mandates the UE to start or restart drx-InactivityTimer if the PDCCH indicates a new transmission (DL or UL). The on DurationTimer mentioned above is another standardized timer that supervises the duration of the on-duration phase.

It should be noted that the third requirement above intends to make sure that the UE is monitoring PDCCH for adaptive retransmission grants when the HARQ retransmission has been suspended by HARQ ACK or there has been NACK-to-ACK error.

From the foregoing discussion, it will be apparent that in current systems the eNodeB does not have any immediate means to completely stop retransmissions, but can only halt non-adaptive retransmissions, e.g., ACK on PHICH always results in suspension. One problem with systems and methods which employ such an unconditional ACK suspension is a waste of battery power. Accordingly, it would be desirable to provide devices, systems, nodes and methods that would alleviate the impact of these problems.

Acronyms/Abbreviations

ACK Acknowledge (HARQ Acknowledge)
ARQ Automatic Repeat request
CCCH Common Control Channel
CE Control Element (as in MAC control element)
C-RNTI Common Radio Network Temporary Identity
CQI Channel Quality Identifier
DCI Downlink Control Information
DL DownLink
DRX DiscontinuousReception
DTX Discontinuous Transmission
eNodeB enhancedNodeB
HARQ Hybrid ARQ
HARQ RTT HARQ Round Trip Time
IE Information Element (RRC "control element")
LCID Logical Channel Identity
MAC Medium Access Control
NACK Negative Acknowledge (HARQ Negative Acknowledge)
NDI New Data Indicator
PDCCH Physical DL Control Channel
PDCP Packet Data Convergence Protocol
PDU Protocol Data Unit
PHICH Physical HARQ Indicator channel
PUCCH Physical UL Channel
PUSCH Physical UL Shared Channel
RLC Radio Link Control
ROHC Robust Header Compression
RRC Radio Resource Control
RV Redundancy Version
SDU Service Data Unit
SPS Semi-Persistent Scheduling
UE User Equipment
UL UpLink

SUMMARY

The embodiments present solutions to, for example, the problem of unnecessary preparedness for suspended retransmissions in the user equipment (UE) which contributes to power drain in the device battery. The embodiments provide, for example, a more effective duty-cycle for the UE and thereby a potential for an improved conservation of its battery resources. An advantage of these embodiments is that they can avoid UE autonomous solutions and retain eNodeB control of uplink (UL) data transfer. It will be appreciated by those skilled in the art, however, that the invention is not limited to those embodiments which produce any or all of these advantages or benefits and that other advantages and benefits may be realized depending upon the particular implementation.

According to an embodiment, there is method for monitoring a Physical Downlink Control Channel (PDCCH) for adaptive retransmission grants in a radio communication system, the method includes: monitoring, by a user equipment (UE), the PDCCH for adaptive retransmission grants; receiving, by the UE, a hybrid automatic repeat request (HARQ) acknowledge (ACK) message, and ceasing, by the UE, to monitor the PDCCH for adaptive retransmission grants after receipt of the HARQ ACK message.

According to another embodiment, there is a user equipment (UE) for monitoring a Physical Downlink Control Channel (PDCCH) for adaptive retransmission grants in a radio communication system, the UE includes: a processing circuitry configured to monitor the PDCCH for adaptive retransmission grants; a radio circuitry configured to receive a hybrid automatic repeat request (HARQ) acknowledge (ACK) message; and the processing circuitry configured to cease monitoring the PDCCH for adaptive retransmission grants after receipt of the HARQ ACK message.

According to another embodiment, there is a method for monitoring a Physical Downlink Control Channel (PDCCH) for adaptive retransmission grants in a radio communication system, the method comprising: transmitting, by a network node, a message which instructs a user equipment to cease monitoring the PDCCH after receipt of a hybrid automatic repeat request (HARQ) acknowledge (ACK) message.

According to another embodiment, there is a network node for monitoring a Physical Downlink Control Channel (PDCCH) for adaptive retransmission grants in a radio communication system, the network node comprising: a radio circuitry configured to transmit a message which instructs a user equipment to cease monitoring the PDCCH after receipt of a hybrid automatic repeat request (HARQ) acknowledge (ACK) message.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 illustrates Rel-8/9/10/11 DRX behaviour with a Semi-Persistent Scheduling (SPS) interval of 40 ms, and DRX parameters of: OnDurationTimer=1 ms, drx-InactivityTimer=1 ms, DRX Cycle=40 ms, and DRX offset=8;

FIG. 7 illustrates Rel-8/10/11 DRX behaviour with an SPS interval of 20 ms, and with DRX parameters of: OnDurationTimer=1 ms, drx-InactivityTimer=1 ms, DRX Cycle=40 ms, and DRX offset=8;

FIG. 8 illustrates an optimized DRX behavior with an SPS interval of 40 ms, and DRX parameters: OnDurationTimer=1 ms, drx-InactivityTimer=1 ms, DRX Cycle=40 ms, DRX offset=8 according to an embodiment;

FIG. 9 shows optimized DRX behavior with an SPS interval of 20 ms, and DRX parameters: OnDurationTimer=1 ms, drx-InactivityTimer=1 ms, DRX Cycle=40 ms, DRX offset=8 according to an embodiment;

FIG. 13 is another flowchart illustrating a method according to an embodiment;

DETAILED DESCRIPTION

Figure 1:
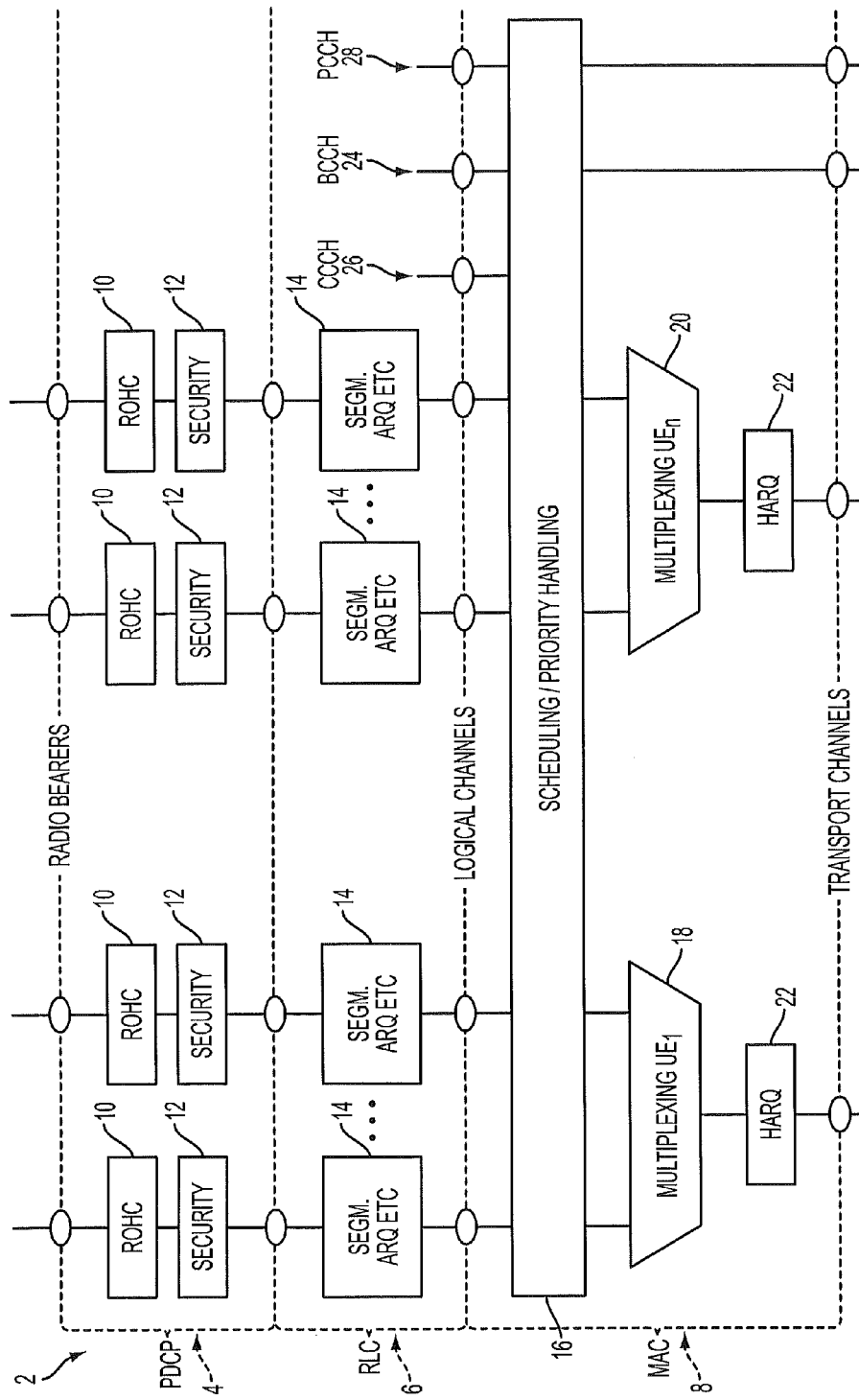
FIGS. 1 and 2 illustrate the Layer 2 architecture for the downlink and uplink, respectively, in Long Term Evolution (LTE)
Figure 2:
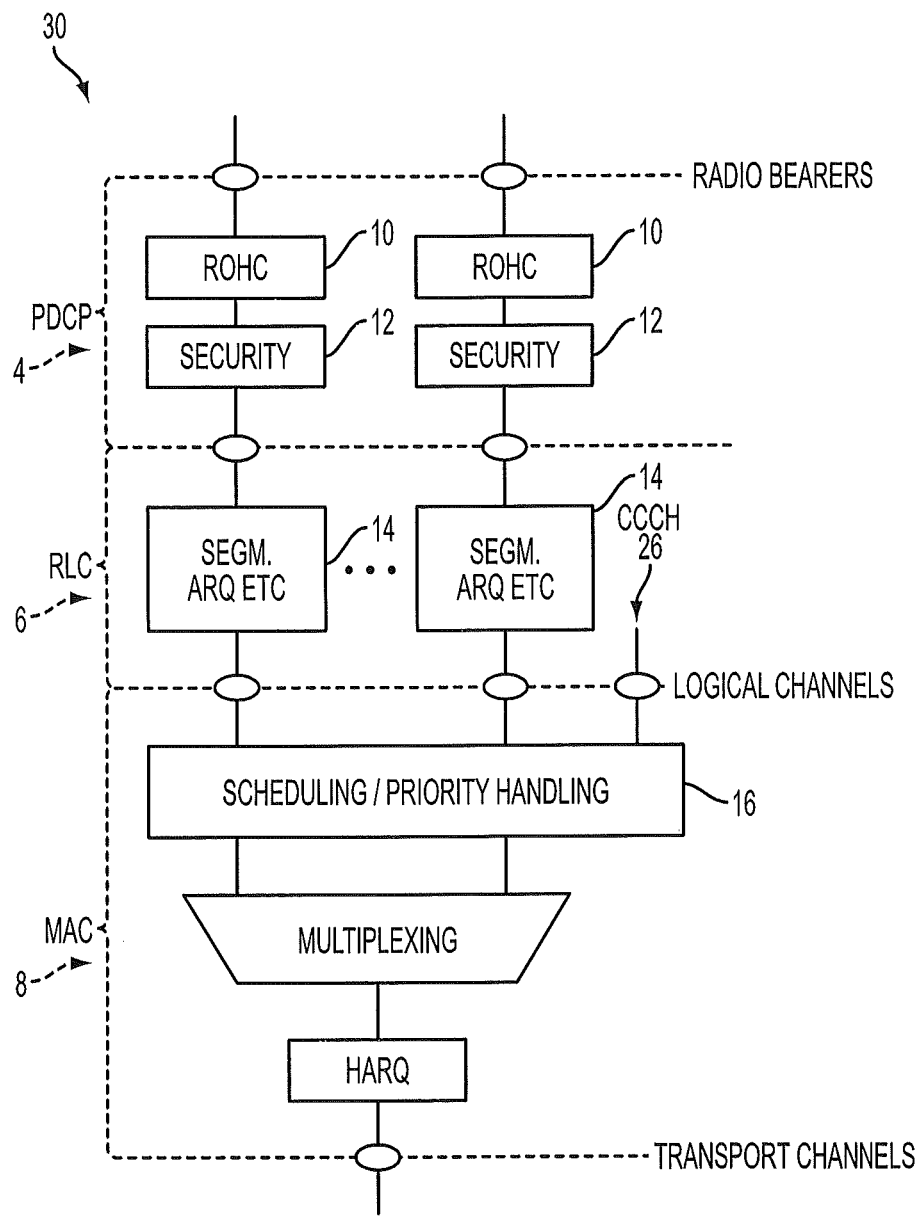
Figure 3:
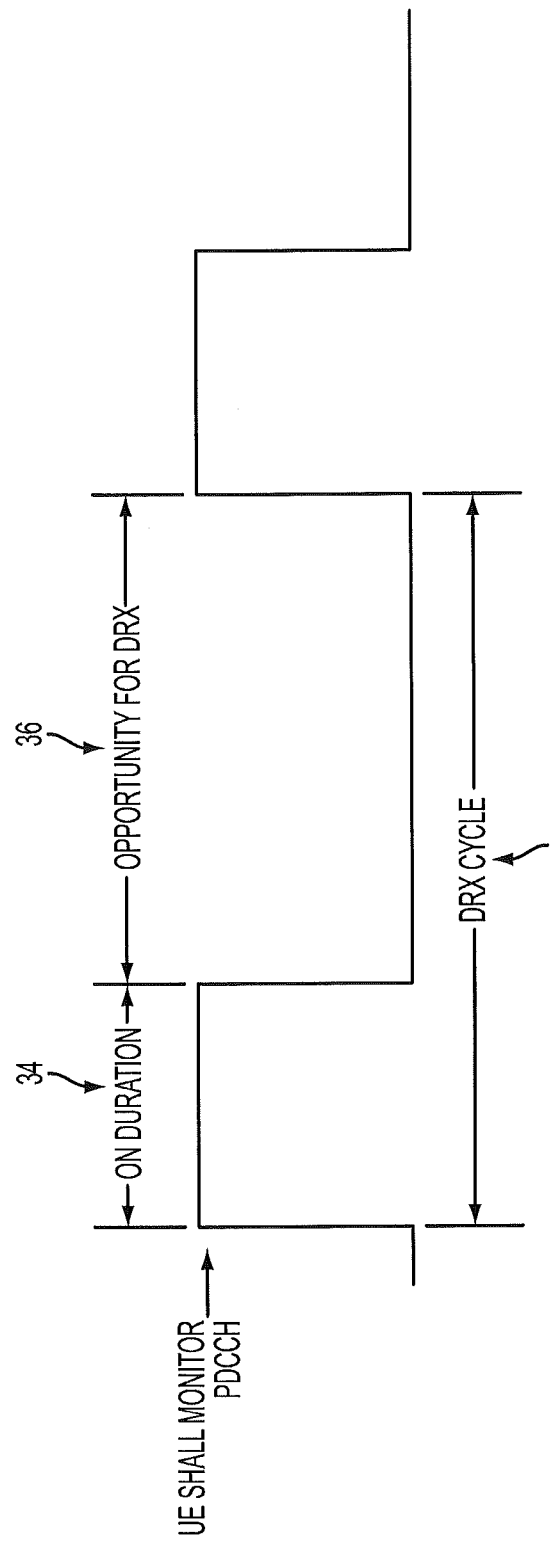
FIG. 3 shows Discontinuous Reception (DRX) opportunities between periods of on-duration.
Figure 4:
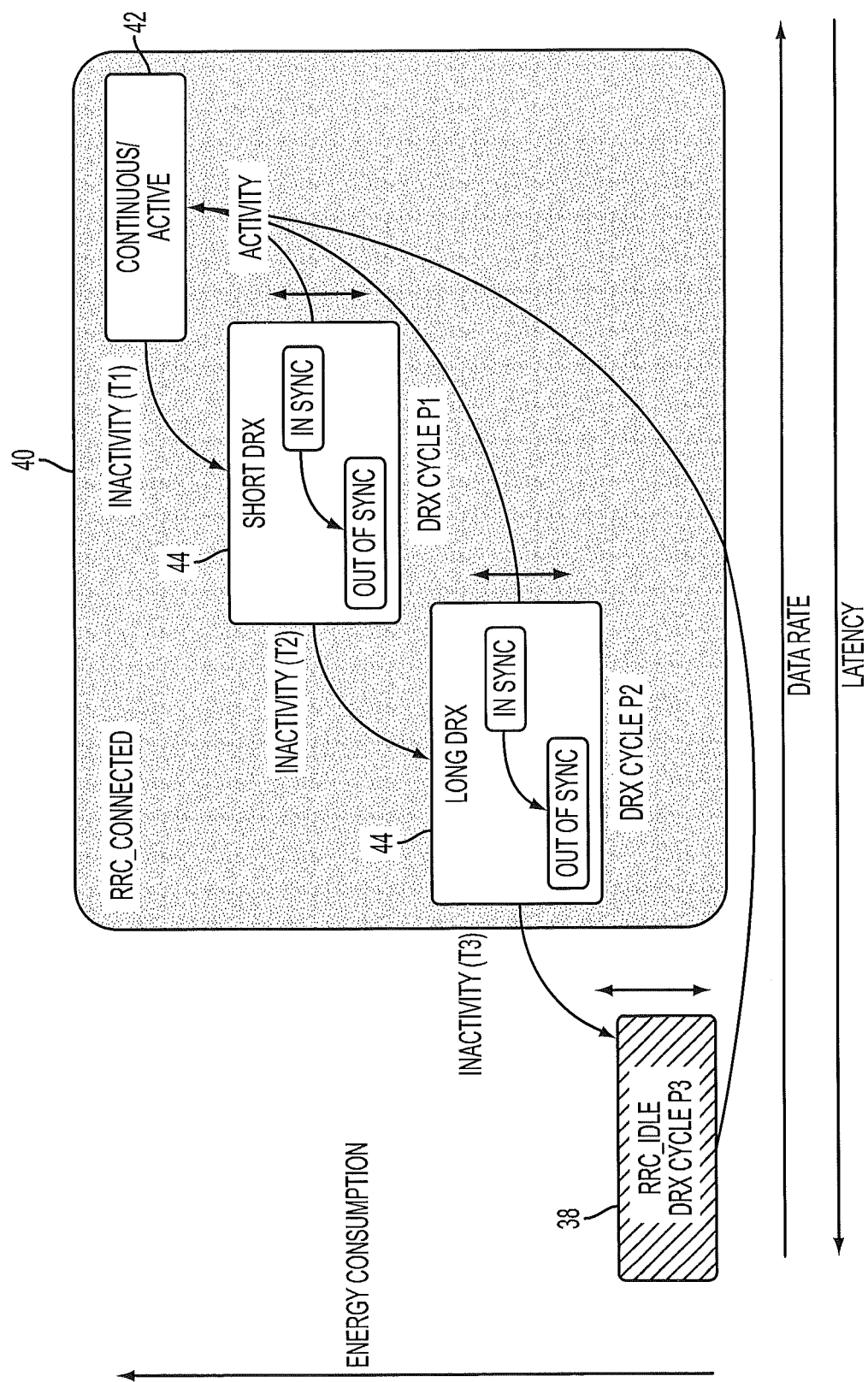
FIG. 4 illustrates an LTE state model including sub-states and transitions.
Figure 5:
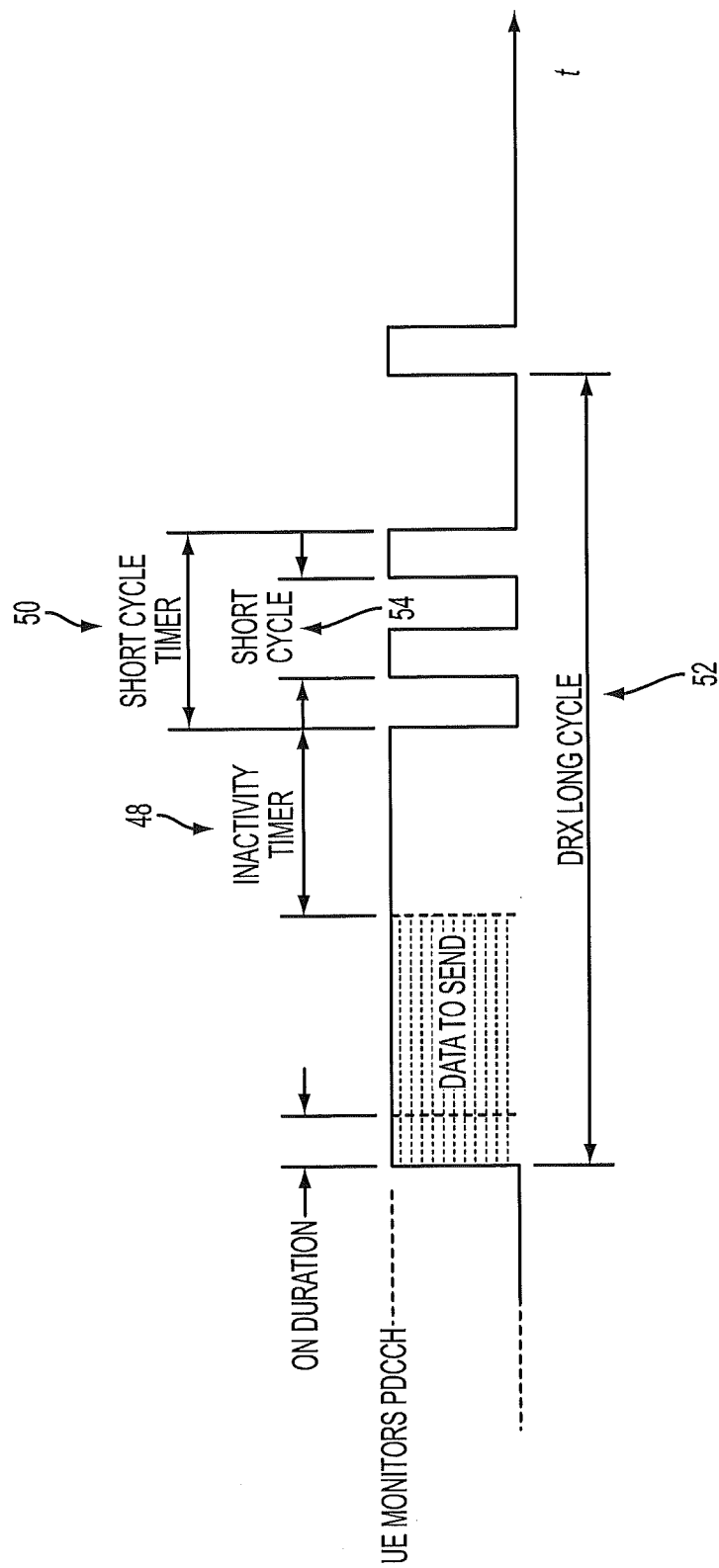
FIG. 5 illustrates transitions following inactivity from Continuous/Active to DRX using Short DRX cycles and then to DRX using Long DRX cycles.

The following description of the exemplary embodiments refers to the accompanying drawings. The same reference numbers in different drawings identify the same or similar elements. The following detailed description does not limit the embodiments. Instead, the scope of the invention is defined by the appended claims. The following embodiments are discussed, for simplicity, with regard to the terminology and structure of a network communication system. However, the embodiments to be discussed next are not limited to these systems, but may be applied to other existing systems that provide services based on exchanging packets of data among devices.

Reference throughout the specification to "one embodiment" or "an embodiment" means that a particular feature, structure, or characteristic described in connection with an embodiment is included in at least one embodiment of the present disclosure. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As mentioned above, and from the foregoing Background discussion, it will be apparent that in current systems the base station, e.g., an eNodeB, does not have any immediate means to completely stop retransmissions, but can only halt non-adaptive retransmissions, e.g., a positive acknowledgement (ACK) on a Physical HARQ Indicator Channel (PHICH) always results in suspension. To more fully understand this problem, consider the following.

In current Discontinuous Reception (DRX) operation, the user equipment (UE) must stay active for receiving possible adaptive retransmission grants until the Hybrid Automatic Repeat reQuest (HARQ) buffer is flushed. The UE is active unconditionally, even after receiving a positive HARQ acknowledgement, HARQ ACK, as a response to an uplink (UL) transmission. The UE must always stay prepared to receive a grant for an adaptive retransmission and many times that preparedness comes with little or no gain. If the UE does not need to monitor Physical Downlink Control Channel (PDCCH) for adaptive retransmission grants when it has received a HARQ ACK, the UEs power consumption can be greatly reduced.

However, there are some reasons why it can be beneficial to monitor PDCCH even when a HARQ ACK is received:

(1) there might be NACK-to-ACK errors in the HARQ feedback. The network can find this error from detecting missing UL retransmission and let that trigger a new transmission one HARQ RTT later; and/or (2) the network may suspend the UL retransmission with a HARQ ACK. This could be done, for example, when radio resources need to be allocated for another UE having higher priority traffic, e.g., the transmission of a Msg3. However, it is also important to consider power efficiency, as is described in more detail later in the specification.

The reception of ACK will make the UE put an instant and irreversible stop to non-adaptive retransmissions but the UE will still keep the corresponding data and monitor PDCCH for the possible chance of delayed retransmission grants, i.e., grants for so called adaptive retransmission. Any measures taken by an eNodeB to put a full stop to transmissions will only indirectly and slowly take effect in the UE. Consider the following relevant 3GPP standard subclauses:

Sub-clause 5.2: the UE flushes the HARQ buffer at expiry of the timer supervising time alignment (timeAlignmentTimer); This timer is of a magnitude much larger than intended HARQ persistency.

Sub-clause 5.4.2.2. The UE replaces the content of HARQ buffer when receiving.

Sub-clause 5.4.2.2. The UE flushes the HARQ buffer when the variable CURRENT_TX_NB=maximum number of transmissions−1; The UE will only peg the counter in the unlikely event of PDCCH misdetection.

Sub-clause 5.9. The Medium Access Control (MAC) layer in the UE will reset if requested by higher layers; all timers are stopped, all variables reset and all buffers are flushed; The timers and maxRetxThreshold used by higher layers results in delays which are much larger than intended HARQ persistency.

As mentioned earlier, one problem with the present, unconditional ACK suspension is a waste of battery power. The battery waste problem is addressed in 3GPP R2-090120—Active time for a pending HARQ retransmission, which proposes a solution, specifically a solution which is autonomous in the MAC layer of UE. But that solution does not leave the eNodeB in control and that solution does not reuse the benefits of pending/suspended HARQ retransmissions as discussed in the Background. That proposal was presented to the proper standardization body (3GPP TSG RAN WG2 #64bis) but was rejected.

Thus embodiments described herein propose to conditionally halt or DRX-optimize further HARQ retransmissions in the UE and make it optional for the eNodeB to clear or DRX-optimize any pending adaptive retransmissions in certain scenarios when an eNodeB has correctly received a HARQ transmission. Among other things, embodiments permit the eNodeB to use specific control(s) that will inform the UE that further retransmissions are not expected, e.g., either postponed to a certain specific future or as a permanent condition, and the UE can instead continue with DRX opportunity.

The embodiments also permit the eNodeB to alternate the UE behavior upon reception of HARQ ACK as follows: 1) stay prepared to receive a postponed grant for adaptive retransmissions (as in current Release 8/9/10/11 standard specification); 2) flush HARQ buffer and stop all further retransmissions (not covered in current standard specification); and/or 3) stay prepared to receive a postponed grant for adaptive retransmission, but only on certain occasions that are beneficial from viewpoint of DRX operation (not covered in current standard specifications).

Initially, twelve embodiments are discussed below, although it will be apparent to those skilled in the art that other embodiments are also possible. Six first embodiments (E1, E2, E3, E4, E5, E6) feature preventive solutions that prepare the UE to act in the following ways:

E1. After receiving the HARQ ACK, the UE does not need to monitor PDCCH for adaptive retransmission grants (the UE may flush the corresponding HARQ buffer). This behavior is controlled in advance (as compared to the occasion when transmitting HARQ ACK) by the eNodeB with a specific Radio Resource Control (RRC) configuration or reconfiguration.

E2. After receiving the HARQ ACK, the UE does not need to monitor PDCCH for adaptive retransmission grants (the UE may flush the corresponding HARQ buffer). This behavior is controlled by the eNodeB with a specific MAC Control Element (CE) either in advance or at the latest in the same subframe as the HARQ ACK occurs.

E3. After receiving the HARQ ACK, the UE keeps the data in the HARQ buffer (as in current Release 8/9/10/11) but is not required to monitor PDCCH only due to adaptive retransmission grants. Any next grant for this HARQ process must additionally occur aligned to the next occasion of DRX Active Time, such as during the next on-duration phase. This behavior is controlled in advance (as compared to the occasion when transmitting HARQ ACK) by the eNodeB with a specific RRC configuration or reconfiguration.

E4. After receiving the HARQ ACK, the UE keeps the data in the HARQ buffer (as in current Release 8/9/10/11) but is not required to monitor PDCCH only due to adaptive retransmission grants. Any next grant for this HARQ process must additionally occur aligned to the next occasion of DRX Active Time, such as during the next on-duration phase. This behavior is controlled by the eNodeB with a specific MAC CE either in advance or at the latest in the same subframe as the HARQ ACK occurs.

E5. After receiving the HARQ ACK, the UE keeps the data in the HARQ buffer (as in current Release 8/9/10/11) but is only required to monitor PDCCH for adaptive retransmission grants at the PHICH occasion that follows the next granted transmission occasion (i.e., any next grant for this HARQ process must additionally occur aligned to the next occasion of PHICH feedback; for frequency division duplexing (FDD): PHICH occasion vs. Physical Uplink Shared Channel (PUSCH) transmission occasion is n+4). This behavior is controlled in advance (as compared to the occasion when transmitting HARQ ACK) by the eNodeB with a specific RRC configuration or reconfiguration.

Figure 10:
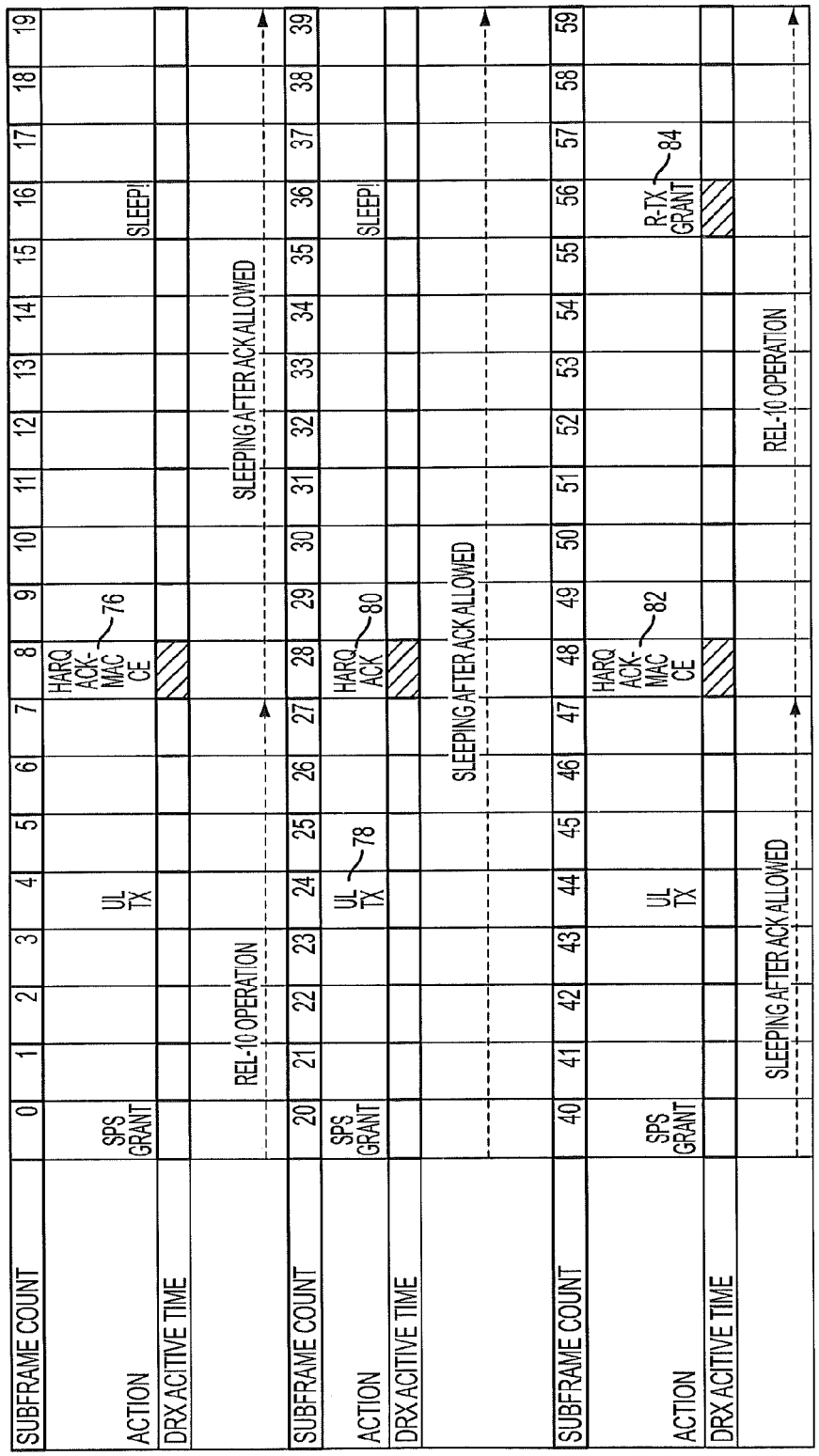
FIG. 10 shows optimized DRX behavior with an SPS interval of 20 ms, and DRX parameters: OnDurationTimer=1 ms, drx-InactivityTimer=1 ms, DRX Cycle=40 ms, and DRX offset=8 according to an embodiment.

E6. After receiving the HARQ ACK, the UE keeps the data in the HARQ buffer (as in current Release 8/9/10/11) but is only required to monitor PDCCH for adaptive retransmission grants at the PHICH occasion that follows the next granted transmission occasion (i.e., any next grant for this HARQ process must additionally occur aligned to the next occasion of PHICH feedback; for FDD: PHICH occasion vs. PUSCH transmission occasion is n+4). This behavior is controlled by the eNodeB with a specific MAC CE either in advance or at the latest in the same subframe as the HARQ ACK occurs (this solution is illustrated in FIG. 10, described below).

Among other things, these first six embodiments can employ a control message transmitted by a base station (e.g., an eNodeB) which is separate from the HARQ ACK message (e.g., which control message is transmitted either in advance of, or in the same subframe as, the HARQ ACK message). This control message is sometimes referred to herein as an "adaptive retransmission grant control message", and it can be used to instruct the UE how to monitor the PDCCH after receipt of an HARQ ACK message, e.g., in any of the six ways mentioned above.

Six further embodiments (E7, E8, E9, E10, E11, E12) that set the UE to act in a more direct manner (i.e., it is not HARQ ACK that triggers the UE's behavior) are described briefly below.

E7. The UE is required to monitor PDCCH for adaptive retransmission grants (as per current Release 8/9/10/11) except if explicitly indicated by a specific grant implying that further grants are not expected for this HARQ process. The UE may flush the corresponding HARQ buffer when it detects the specific grant.

E8. The UE is required to monitor PDCCH for adaptive retransmission grants (as per current Release 8/9/10/11) except if explicitly indicated by a specific MAC CE that further grants are not expected for this HARQ process. The UE may flush the corresponding HARQ buffer when it detects the specific MAC CE.

E9. The UE is required to monitor PDCCH for adaptive retransmission grants (as per current Release 8/9/10/11) except if explicitly indicated by a specific grant implying that further grants are not expected for this HARQ process unless they occur during DRX Active Time due to other timers and requirements. The UE keeps the data in the HARQ buffer also when it detects the specific grant.

E10. The UE is required to monitor PDCCH for adaptive retransmission grants (as per current Release 8/9/10/11) except if explicitly indicated by a specific MAC CE implying that further grants are not expected for this HARQ process unless they occur during DRX Active Time due to other timers and requirements. The UE keeps the data in the HARQ buffer also when it detects the specific MAC CE.

E11. The UE is required to monitor PDCCH for adaptive retransmission grants (as per current Release 8/9/10/11) except if explicitly indicated by a specific grant implying that further grants are not expected for this HARQ process unless they occur at the PHICH feedback occasion (i.e., any next grant for this HARQ process may only occur aligned to the next occasion of PHICH feedback; for FDD: PHICH occasion vs. PUSCH transmission occasion is n+4). The UE keeps the data in the HARQ buffer also when it detects the specific grant.

E12. The UE is required to monitor PDCCH for adaptive retransmission grants (as per current Release 8/9/10/11) except if explicitly indicated by a specific MAC CE implying that further grants are not expected for this HARQ process unless they occur at the PHICH feedback occasion (i.e., any next grant for this HARQ process may only occur aligned to the next occasion of PHICH feedback; for FDD: PHICH occasion vs. PUSCH transmission occasion is n+4). The UE keeps the data in the HARQ buffer also when it detects the specific MAC CE.

Consider an embodiment where the UE is required to monitor PDCCH for adaptive retransmission grants except if explicitly indicated either by a specific grant or a MAC CE that further grants must only occur aligned to the next occasion of PHICH feedback. As compared to embodiments E1-E6, this embodiment (basically a combination of portions of E11 and E12) is a more flexible approach since dynamic suspension of an UL retransmission is possible. Signaling of a grant or MAC CE is more robust than a HARQ ACK, data loss due to NACK-to-ACK error is minimized. However, a drawback of this solution is increased PDCCH load since an additional PDCCH assignment is needed for each UL transmission to allow the UE to sleep.

In these latter six embodiments E7-E12, the behavior of the UE relative to monitoring the PDCCH in connection with adaptive retransmission grants is controlled via a single message wherein the HARQ ACK message is essentially merged with an instruction that informs the UE how to perform monitoring of the PDCCH relative to adaptive retransmission grants subsequent to receipt of that message.

The embodiments also comprise the opposite behavior as possibly invoked by any of the above-mentioned methods, e.g., toggling of behaviors. That is all of the above-embodiments further contemplate the provision of controls to the eNodeB which reverse the behaviors described above, i.e., to return to normal monitoring of the PDCCH for adaptive retransmission grants.

The foregoing embodiments can also include the above-described scenarios in the Background section relating to ACK suspension where the preparedness of postponed retransmission in the UE is beneficial. However, these embodiments can then change the unconditional behavior upon receiving ACK to one being conditional upon new optional eNodeB control that may occur either in combination with ACK (E1-E6) or by their own control (E7-E12).

In order to better understand the benefits associated with conditional halting or DRX-optimizing of further HARQ retransmissions in the UE and, optionally, permitting the eNodeB to clear or DRX-optimize any pending adaptive retransmissions under certain scenarios, consider the following voice conversation example (although it will be appreciated by those skilled in the art that the present invention is not limited in its applicability to voice conversations). There is a voice conversation ongoing (one speaker is silent). The Voice over Internet Protocol (VoIP) packets are transmitted in the uplink direction every 20 ms. The UE is scheduled with a Semi-Persistent grant every 20 ms as well. At minimum, the UE needs to be active 1 ms for UL transmission and n ms for adaptive retransmission grants, where n corresponds to the maximum number of UL HARQ retransmissions. In a typical case, n is 4. This means that if the UE receives a HARQ ACK already for the initial UL transmission, it needs to be active for another 3 ms, which results in a 300% increase in power consumption as compared to the case where the UE can go to sleep after receiving an ACK.

The current Rel-8/9/10/11 DRX behavior for the FDD technology is depicted in FIG. 6 and FIG. 7 for Semi-Persistent Scheduling (SPS) resource intervals of 40 ms and 20 ms, respectively. It can be seen that for each SPS resource interval, the UE is active for a total of 4 ms and 5 ms, respectively. For example, in FIG. 6 during the 40 ms SPS, subframes 55, 56, 58 and 60 are active. In FIG. 7, blocks 62, 64, 66, 68 and 70 are active.

If the UE does not need to monitor PDCCH for adaptive retransmission grants when it has received a HARQ ACK, power consumption is greatly reduced. This is depicted in FIG. 8 and FIG. 9 for SPS periods of 40 ms and 20 ms, respectively. For a 40 ms SPS period, DRX active time is reduced by 75% and for a 20 ms SPS period, DRX active time is reduced by 80%. This can be seen where, in FIG. 8, only block 72 is active as compared to the four active blocks (54, 56, 58 and 60) shown in FIG. 6 and in FIG. 9 where block 74 is active as compared to the five active blocks (62, 64, 66, 68 and 70) shown in FIG. 7.

With this in mind, more details regarding the first six embodiments which were briefly introduced will now be provided. Consider that, in at least these first six embodiments, one aspect is to introduce new, explicit and optional eNB control that prevents pending HARQ retransmissions from occurring unless needed. When adaptive retransmission grants are not expected, the UE is allowed to go to its DRX state.

The six first embodiments (E1-E6) therefore feature preventive solutions that prepare the UE in advance to act in either of two ways when receiving ACK, i.e., either that the UE expects that pending HARQ retransmissions are continued or discontinued.

Also the opposite behavior is invoked by either of these methods. That is all of the above-embodiments further contemplate the provision of controls to the eNodeB which reverse the behaviors described above, i.e., to return to normal monitoring of the PDCCH for adaptive retransmission grants.

In the above embodiments, for example, E1-E6, "receiving HARQ ACK" can refer to the actual explicit reception of ACK on PHICH. Alternatively or additionally, "receiving HARQ ACK" can refer to the case when the MAC layer concludes HARQ ACK when PHICH for HARQ feedback has not been received, e.g., due to measurement gap. However, because after measurement gap, retransmission is expected, it can be preferable that the UE monitors PDCCH for adaptive retransmission grants.

From a specification point of view, the embodiments E1, E3 and E5 are likely the simplest ones, since only RRC signaling is needed. On the other hand, these solutions do not provide any mechanism for the network to adaptively suspend UL retransmissions (less than invoking the opposite behavior). The solutions are also prone to data loss when NACKto-ACK error occurs since the UE will no longer monitor PDCCH after receiving HARQ ACK. However, the solutions can be used to relax PDCCH monitoring for bearers that are tolerant to some low-probability loss of UL data which can be considered to be acceptable.

The solutions described in embodiments E2, E4 and E6 are more dynamic since MAC CEs are less costly in terms of signaling load and offer faster ways to dynamically change the PDCCH monitoring mode and thus suspend UL retransmissions when needed.

The specific MAC CE in the embodiments E2, E4, and E6 can be anyone of the present MAC CEs used over the Downlink Shared Channel (DL-SCH) in the Release 11 version of 3GPP TS 36.321, such as the DRX Command MAC CE encoded as Logical Channel Identification (LCID) 11110, but it can also be a new MAC CE.

The specific RRC Configuration or reconfiguration in the solutions of embodiments E1, E3 and E5 can use the present Information Elements (IEs) in the Release 11 version of 3GPP TS 36.331, version 11.1.0 (2012-09) but it can also use new RRC IEs.

One illustration of the above solutions is depicted in FIG. 10. The particular illustration describes solutions E4 (and E6) and in a way when the transmission of the MAC CE coincides with the transmission of HARQ ACK (i.e., 'at the latest'). The sequence of events starts with the behavior according to current Release 11, the UE monitors PDCCH for adaptive retransmission grants normally. The UE uses its granted (in this case pre-granted by SPS) transmission occasion in subframe 4. Then, the eNodeB uses the solution described above in embodiment E6 and acknowledges the correct reception by transmitting the special MAC CE alongside ACK 76 in subframe 8. In addition, the eNodeB uses the solution E4 (or E6) by transmitting the special MAC CE alongside with ACK 76, thus enabling the new behavior.

The next granted transmission occasion 78 occurs in subframe 24 and its corresponding PHICH occasion occurs in subframe n+4=28, eNodeB acknowledges the correct reception in subframe 28 by a single ACK 80. This single ACK 80 does not change the behavior as was triggered by the MAC CE in subframe 8. In subframe 36 the UE does not need to monitor the PDCCH for an adaptive retransmission grant. In subframe 48, the network wants the UE to move back to the normal control of adaptive retransmission. Thus, it transmits a MAC CE 82 invoking the opposite behavior. That enables eNodeB to schedule a grant for adaptive retransmission 84 (in this case directly in subframe 56 one HARQ RTT later but the grant for adaptive retransmission could occur after any multiple of HARQ Round Trip Times (RTTs)).

A detailed method can use additional input to decide on the UE behavior upon receiving ACK. It can use UE measurements to judge radio quality such as physical layer Channel Quality Indicator (CQI) or RRC layer cell measurements, e.g., in such a way that the above-mentioned behavior is triggered only when the radio quality is worse than a predefined level, and de-triggered only if radio quality is again better than a predefined level.

Furthermore, the above solutions to disable/enable HARQ suspensions and PDCCH monitoring for adaptive retransmission grants can be applied selectively for certain transport block (TB) sizes, logical channels or RLC mode (acknowledged/unacknowledged).

The above embodiments also include solutions where the UE is allowed to autonomously decide when the further adaptive retransmission grants are expected and when they are not expected after HARQ ACK based on the measured radio link quality, e.g., in a way that the above-mentioned behavior is triggered only when the radio quality is worse than a predefined level, and de-triggered only if radio quality is again better than a predefined level.

Having discussed the first six embodiments in more detail, the discussion now turns to the second six embodiments. To reiterate, these embodiments E7-E12 operate in a somewhat more direct manner than the embodiments E1-E6.

As with the previous embodiments, the opposite behavior can be invoked by any of these embodiments, E7-E12. That is all of the above-embodiments further contemplate the provision of controls to the eNodeB which reverse the behaviors described above, i.e., to return to normal monitoring of the PDCCH for adaptive retransmission grants.

A difference between the methods used by the first six embodiments and those described in the latter six embodiments is that the eNodeB can act in a more immediate manner, thus providing it with a larger flexibility to adapt to changes in radiochannel and/or resource situation.

The specific grant in embodiments E7, E9 and 11 can be provided by, for example, encoded feedback over PHICH (e.g., a 'Super-ACK'). It can also be a grant over PDCCH but one that uses a specific Downlink Control Information (DCI), or a special-sized TB, some combination that may include New Data Indicator (NDI) or Redundancy Version (RV) values, e.g., not toggling NDI but change TB size of the retransmission grant or changing RV but also TB size (also known as "inconsistent grants"). Also a grant triggering aperiodic CQI transmission can be reused to be the trigger of the intended UE behavior.

The specific MAC CE in embodiments E8, E10 and E12 can be anyone of the present MAC CEs used over DL-SCH in the Release 11 version of 3GPP TS 36.321, such as the DRX MAC CE encoded as LCID 11110, or a part of the present MAC CEs, but it can also be a new MAC CE.

The mapping between a MAC CE and UL HARQ process can be implicitly done based on timing so that the MAC CE is carried in the same subframe as the UL grant. Alternatively, they can be carried separately but instead a UL HARQ process number can be explicitly signaled in the MAC CE.

As with the previous embodiments E1-E6, embodiments E7-E12 can use additional input to decide on suspension of adaptive retransmissions.

Currently, PDCCH monitoring for adaptive retransmission grants is tightly tied to the HARQ buffer status. Until the HARQ buffer is flushed, the UE shall monitor PDCCH (per current conventional methods) for adaptive retransmission grants. For all embodiments described above, as well as other embodiments consistent with those described herein, it is possible to either 1) flush the corresponding HARQ buffer when the indication (HARQ ACK/grant/MAC CE) is received or 2) keep the soft bits in the HARQ buffer but ease up on the monitoring PDCCH. In some scenarios it is better to let the UE keep the data in the HARQ buffer, in particular when the risk of NACK-to-ACK errors are high, since retransmission can many times be scheduled some HARQ RTTs later when the reception conditions are better, e.g., UE is again in Active DRX Time due, for example, to OnDuration Timer.

Associated with the various embodiments described herein, it may be of value to discuss the potential impact of L1 and L2 control message errors. Two potential error cases introduced with the new MAC CE and solutions to overcome those potential error cases are described below.

Firstly, consider NACK-to-ACK error on PHICH as a response to UL transmission. In normal operation, the network can detect missing (as in absent) UL transmission and can trigger adaptive retransmission one HARQ RTT later.

However, with power optimized operation mode controlled by MAC CE, this is not possible. However, as described above, a retransmission can be scheduled some HARQ RTTs later, assuming that the DRX cycle is dividable by the HARQ RTT.

Secondly, consider NACK-to-ACK error on PUCCH as a response to the DL transmission carrying the new MAC CE. In this case, the DRX operation mode is not synchronized between the UE and the eNB. If the UE missed the MAC CE allowing sleeping, then the UE is unnecessarily active even if data is not expected. This error can be minimized by repeating MAC CEs a few times. If the UE missed the MAC CE disabling sleeping, it does not monitor PDCCH even if it should. The network can detect unsynchronized behavior from the missing (as in absent) UL retransmissions and correct it.

The first error type is more common than the second error type. A typical design target for PUCCH robustness is to ensure that NACK-to-ACK error does not reach the probability of $10^{-3}$. If the HARQ error rate is ten percent, the probability of data loss due to NACK-to-ACK error is then $10^{-4}$. This is expected to lead to the situation where that even if these error cases occur, they should be rather rare in frequency and solvable by the network.

The embodiments provide for a number of advantages, some of which will now be discussed. The embodiments present solutions to, for example, the problem that an eNodeB has no immediate means to put a full stop to retransmissions in the UE.

The embodiments furthermore present solutions to, for example, the problem of unnecessary preparedness for suspended retransmissions in the UE which contributes to power drain in the device battery. The embodiments provide, for example, a more effective duty-cycle for the UE and thereby a potential for an improved conservation of its battery resources. An advantage of these embodiments is that they avoid UE autonomous solutions and retain eNodeB control of UL data transfer.

The embodiments also make it possible to, for example, further minimize data loss due to a NACK-to-ACK error, since the signaling of a specific MAC CE or a specific grant over PDCCH is more secure than signaling of HARQ ACK over PHICH.

The embodiments also, for example, integrate these new methods as options to the present way to postpone HARQ retransmissions. They do this by, for example, providing a possibility to change the UE behavior upon receiving ACK from a behavior that is unconditional to one that is conditional on additional eNodeB control. The embodiments can, for example, be used in conjunction with scenarios that benefit from postponed retransmissions in the UE, but also permit the eNodeB to execute a complete halt to further retransmissions.

Additionally, it has been observed that UE power consumption is not optimized for small data transmission, e.g., VoIP packets, because the UE needs to be active for adaptive retransmission grants. Additional potential solutions include the following: (1) after receiving HARQ ACK, the UE does not need to monitor PDCCH due to adaptive retransmission grants; (2) allowing sleeping after HARQ ACK is controlled semi-statically by a new MAC CE; and (3) the HARQ buffer shall not be flushed, even when PDCCH is not monitored for adaptive retransmission grants. It is to be understood that additional solutions can be combined in various arrangements, e.g., with each other and/or with portions of other various embodiments described herein.

According to an embodiment, a method for monitoring a PDCCH for adaptive retransmission grants in a radio communication system includes: receiving, by the user equipment, an adaptive retransmission grant control message which instructs the user equipment how to monitor the PDCCH for adaptive retransmission grants, receiving, by a user equipment, a HARQ ACK message, and selectively (a) monitoring the PDCCH, (b) postponing monitoring of the PDCCH or (c) halting monitoring of the PDCCH, by the user equipment, after receipt of the HARQ ACK message, in a manner which is based on the adaptive retransmission grant control message.

According to an embodiment, a method for controlling a monitoring of a PDCCH for adaptive retransmission grants in a radio communication system, the method includes: transmitting, by the base station, an adaptive retransmission grant control message which instructs the user equipment how to selectively (a) monitor the PDCCH, (b) postpone monitoring of the PDCCH or (c) halt monitoring of the PDCCH for adaptive retransmission grants after the user equipment receives a hybrid automatic repeat request HARQ acknowledge ACK message, and transmitting, by a base station, the hybrid automatic repeat request HARQ ACK message.

According to an embodiment, a method for monitoring a PDCCH for adaptive retransmission grants in a radio communication system, the method includes: receiving, by a user equipment, a message which indicates both a HARQ acknowledge and which instructs the user equipment how to monitor the PDCCH for adaptive retransmission grants; and selectively (a) monitoring the PDCCH, (b) postponing monitoring of the PDCCH or (c) halting monitoring of the PDCCH, by the user equipment, after receipt of the message in a manner which is based on the message.

According to an embodiment, a method for controlling a monitoring of a PDCCH for adaptive retransmission grants in a radio communication system, the method includes: transmitting, by a base station, a message which indicates both a HARQacknowledge and which instructs the user equipment how to monitor the PDCCH for adaptive retransmission grants.

According to an embodiment, a method for monitoring a PDCCH for adaptive retransmission grants in a radio communication system, the method includes: receiving, by the user equipment, an adaptive retransmission grant control message which instructs the user equipment how to monitor the PDCCH for adaptive retransmission grants; receiving, by a user equipment, a HARQ ACK message and monitoring, by the user equipment, the PDCCH after receipt of the HARQ ACK message in a manner which is based on the adaptive retransmission grant control message.

According to an embodiment, a method for monitoring a PDCCH for adaptive retransmission grants in a radio communication system, the method includes: receiving, by a user equipment, a message which indicates a HARQ acknowledge and instructs the user equipment how to monitor the PDCCH for adaptive retransmission grants; and monitoring, by the user equipment, the PDCCH after receipt of the message in a manner which is based on the instruction associated with the message.

According to an embodiment, a method for controlling monitoring of a PDCCH for adaptive retransmission grants in a radio communication system, the method includes: transmitting, by the base station, an adaptive retransmission grant control message which instructs the user equipment how to monitor the PDCCH for adaptive retransmission grants, and transmitting, by a base station, a HARQACK message.

According to an embodiment, a method for controlling monitoring of a PDCCH for adaptive retransmission grants in a radio communication system, the method includes: transmitting, by a base station, a message which indicates a HARQ acknowledge and instructs the user equipment how to monitor the PDCCH for adaptive retransmission grants.

According to an embodiment, a method for monitoring a PDCCH for adaptive retransmission grants in a radio communication system, the method includes: receiving, by the user equipment, an adaptive retransmission grant control message which instructs the user equipment that the user equipment does not need to monitor the PDCCH for adaptive retransmission grants after receipt of a HARQ ACK message; and receiving, by the user equipment, the HARQ ACK message. The UE may flush the corresponding HARQ buffer.

According to an embodiment, a method for controlling monitoring of a PDCCH for adaptive retransmission grants in a radio communication system, the method including: transmitting, by the base station, an adaptive retransmission grant control message which instructs the user equipment that the user equipment does not need to monitor the PDCCH for adaptive retransmission grants after receipt of a HARQ acknowledge ACK message, and transmitting, by a base station, the HARQ ACK message. The base station can cease to grant further adaptive retransmissions.

According to an embodiment, a method for monitoring a PDCCH for adaptive retransmission grants in a radio communication system, the method including: receiving, by the user equipment, an adaptive retransmission grant control message which instructs the user equipment to monitor the PDCCH for adaptive retransmission grants only during time periods which are aligned to subsequent DRX Active Times, receiving, by a user equipment, a hybrid automatic repeat request HARQACK message; and monitoring the PDCCH for adaptive retransmission grants in accordance with the adaptive retransmission grant control message. The UE can keep the data in the corresponding HARQ buffer.

According to an embodiment, a method for controlling monitoring of a PDCCH for adaptive retransmission grants in a radio communication system, the method including: transmitting, by the base station, an adaptive retransmission grant control message which instructs the user equipment to monitor the PDCCH for adaptive retransmission grants only during time periods which are aligned to subsequent DRX Active Times, and transmitting, by a base station, a HARQ ACK message. The base station can continue to grant for adaptive retransmissions, but only during DRX Active Times.

According to an embodiment, a method for monitoring a PDCCH for adaptive retransmission grants in a radio communication system, the method including: receiving, by the user equipment, an adaptive retransmission grant control message which instructs the user equipment to monitor the PDCCH for adaptive retransmission grants only during time periods which are aligned to PHICH feedback occasions, receiving, by a user equipment, a HARQACK message; and monitoring the PDCCH for adaptive retransmission grants in accordance with the adaptive retransmission grant control message. The UE can keep the data in the corresponding HARQ buffer.

According to an embodiment, a method for controlling monitoring of a PDCCH for adaptive retransmission grants in a radio communication system, the method including: transmitting, by the base station, an adaptive retransmission grant control message which instructs the user equipment to monitor the PDCCH for adaptive retransmission grants only during time periods which are aligned to PHICH feedback occasions, and transmitting, by a base station, a HARQ ACK message. The base station can continue to grant for adaptive retransmissions, but only during PHICH feedback occasions.

According to an embodiment, a method for monitoring a PDCCH for adaptive retransmission grants in a radio communication system, the method includes: receiving, by a user equipment, a message which indicates both a HARQ ACK and which instructs the user equipment not to monitor the PDCCH for adaptive retransmission grants associated with this HARQ process. The UE may flush the corresponding HARQ buffer.

According to an embodiment, a method for controlling a monitoring of a PDCCH for adaptive retransmission grants in a radio communication system, the method including: transmitting, by a base station, a message which indicates both a HARQ acknowledge ACK and which instructs the user equipment not to monitor the PDCCH for adaptive retransmission grants associated with this HARQ process. The base station can cease to grant further adaptive retransmissions.

According to an embodiment, a method for monitoring a PDCCH for adaptive retransmission grants in a radio communication system, the method includes: receiving, by a user equipment, a message which indicates both a HARQACK and which instructs the user equipment to monitor the PDCCH for adaptive retransmission grants associated with this HARQ process only during DRX Active Time. The UE can keep the data in the corresponding HARQ buffer.

According to an embodiment, a method for controlling a monitoring of a PDCCH for adaptive retransmission grants in a radio communication system, the method including: transmitting, by a base station, a message which indicates both a HARQACK and which instructs the user equipment to monitor the PDCCH for adaptive retransmission grants associated with this HARQ process only during DRX Active Time. The base station can continue to grant for adaptive retransmissions, but only during DRX Active Times.

According to an embodiment, a method for monitoring a PDCCH for adaptive retransmission grants in a radio communication system, the method includes: receiving, by a user equipment, a message which indicates both a HARQACK and which instructs the user equipment to monitor the PDCCH for adaptive retransmission grants associated with this HARQ process only during PHICH feedback occasions. The UE can keep the data in the corresponding HARQ buffer.

According to an embodiment, a method for controlling a monitoring of a PDCCH for adaptive retransmission grants in a radio communication system, the method including: transmitting, by a base station, a message which indicates both a HARQ acknowledge ACK and which instructs the user equipment to monitor the PDCCH for adaptive retransmission grants associated with this HARQ process only during PHICH feedback occasions. The base station can continue to grant for adaptive retransmissions, but only during PHICH feedback occasions.

The embodiments have been described with terms and concepts that apply to a system based on the 3GPP LTE FDD technology but are applicable to other communication systems, at the very least including systems based on the 3GPP LTE TDD technology, but also other systems.

Figure 11:
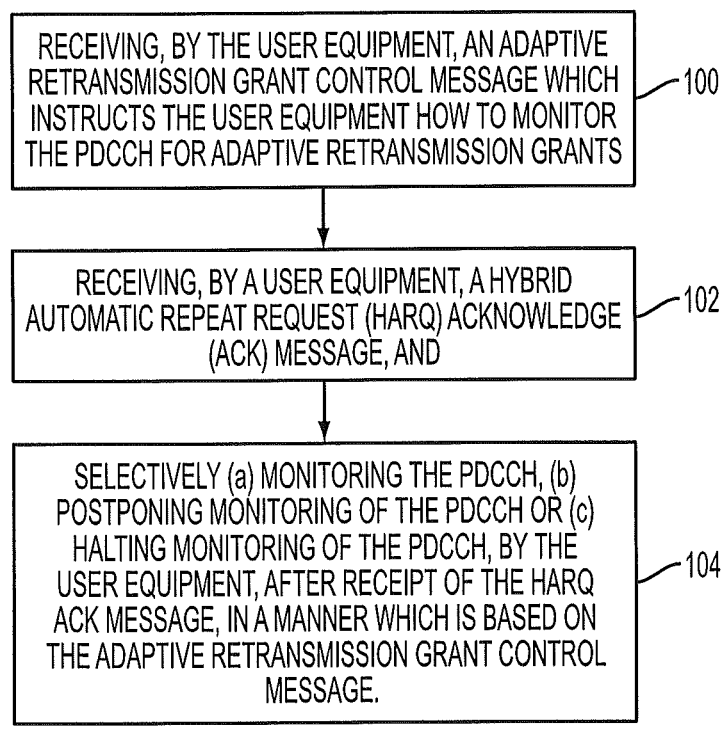
FIG. 11 is a flowchart illustrating a method according to an embodiment.

The foregoing embodiments can be described as, for example, various methods, examples of which are provided both in the Detailed Description and in the Summary, one of which is illustrated in the flow chart of FIG. 11. Therein, at step 100, the user equipment receives an adaptive retransmission grant control message which instructs the user equipment how to monitor the PDCCH for adaptive retransmission grants. At step 102, the user equipment, receives a hybrid automatic repeat request (HARQ) acknowledge (ACK) message. In step 104, the user equipment selectively (a) monitors the PDCCH, (b) postpones monitoring of the PDCCH or (c) halts monitoring of the PDCCH after receipt of the HARQ ACK message, in a manner which is based on the adaptive retransmission grant control message. It should be appreciated that neither the order in which method steps are presented nor the order in which method steps are illustrated in a flow diagram should be construed as requiring a temporal order in which steps are performed.

Figure 12:
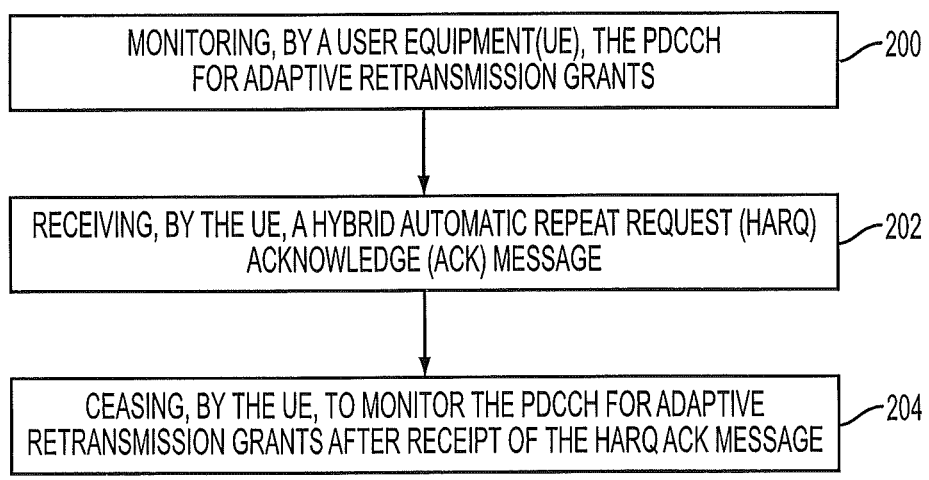
FIG. 12 is another flowchart illustrating a method according to an embodiment.

According to an embodiment, there is a method, as shown in FIG. 12, for monitoring a Physical Downlink Control Channel (PDCCH) for adaptive retransmission grants in a radio communication system, the method including: at step 200, monitoring, by a user equipment (UE), the PDCCH for adaptive retransmission grants; at step 202, receiving, by the UE, a hybrid automatic repeat request (HARQ) acknowledge (ACK) message, and at step 204, ceasing, by the UE, to monitor the PDCCH for adaptive retransmission grants after receipt of the HARQ ACK message. In this context, the phrase "ceasing to monitor the PDCCH for adaptive retransmission grants" broadly means ceasing to monitor the PDCCH for adaptive retransmission grants during at least one transmission resource which normally represents an opportunity for an adaptive retransmission grant to be received and during which the UE would normally monitor the PDCCH for adaptive retransmission grants. For example, "ceasing to monitor the PDCCH for adaptive retransmission grants" includes, but is not limited to, e.g., ceasing to monitor the PDCCH for adaptive retransmission grants except during periods which are aligned with subsequent Active Times, ceasing to monitor the PDCCH for adaptive retransmission grants except during periods which are aligned to PHICH feedback occasions and ceasing to monitor the PDCCH for adaptive retransmission grants at all.

According to an embodiment, there is a method, as shown in FIG. 13, for monitoring a Physical Downlink Control Channel (PDCCH) for adaptive retransmission grants in a radio communication system, the method including: at step 300, transmitting, by an network node, a message which instructs a user equipment to cease monitoring the PDCCH after receipt of a hybrid automatic repeat request (HARQ) acknowledge (ACK) message.

Figure 14:
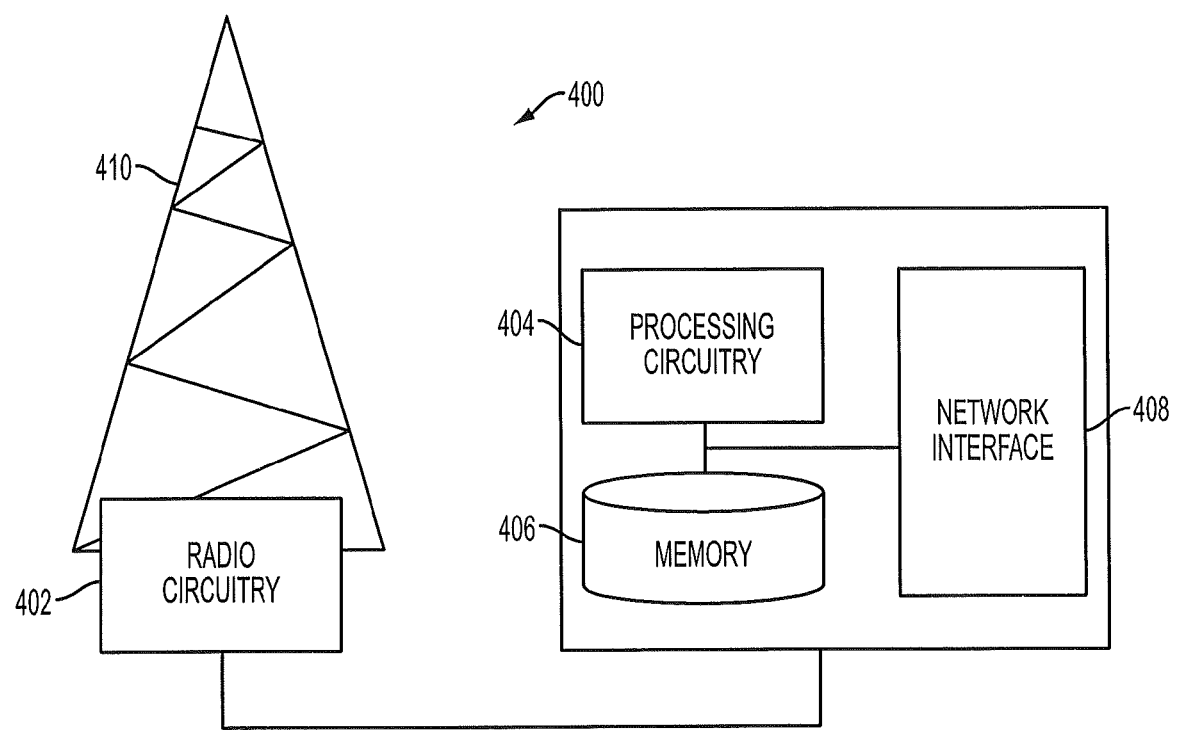
FIG. 14 depicts an exemplary base station in which embodiments can be implemented.

In addition, the foregoing embodiments can be described in terms of their implementation in various devices, equipment or systems, e.g., a UE or base station. FIG. 14 depicts an exemplary eNodeB (or, more generally, a base station) which can, for example, perform the corresponding base station methods described above. This exemplary base station 400 include radio circuitry 402 operatively connected to one or more antennas (or antenna arrays) 410 and to processing circuitry 404 and memory 406. In some variants, the radio circuitry 402 is comprised in the network node 400, whereas in other variants, the radio circuitry 402 is external. A network interface 408 is provided to enable the base station 400 to communicate with other network nodes. The processing circuitry 404 is configured to transmit, for example and via the radio circuitry 402, either adaptive retransmission grant control messages or messages which inform a UE both of an HARQ ACK and how the UE should behave with respect to monitoring the PDCCH.

Figure 15:
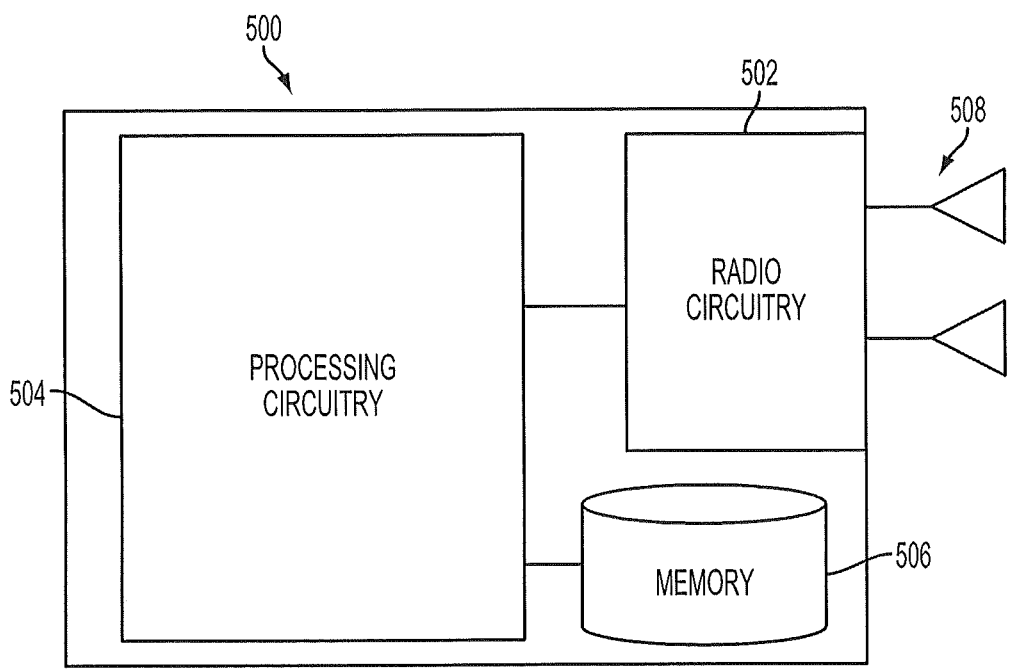
FIG. 15 shows an exemplary user equipment (UE) in which embodiments can be implemented.

A UE 500 is illustrated in FIG. 15. UE 500 can include, for example, radio circuitry 502 connected to one or more antennas 508. The radio circuitry 502 can be connected to processing circuitry 504 which can be connected to one or more memory units 506. The UE 500 can, for example, be used to perform the corresponding UE methods and techniques described above. More specifically, the processing circuitry 504 can be configured to utilize the radio circuitry 502 to receive either adaptive retransmission grant control messages or messages which inform a UE 500 both of an HARQ ACK and how the UE 500 should behave with respect to monitoring the PDCCH. The processing circuitry 504 is further configured to adapt its behavior relative to monitoring adaptive retransmission grants based on the received message, as described above.

It should be understood that this description is not intended to limit the embodiments. On the contrary, the exemplary embodiments are intended to cover alternatives, modifications and equivalents, which are included in the spirit and scope of the inventive concept. Further, in the detailed description of the exemplary embodiments, numerous specific details are set forth in order to provide a comprehensive understanding of the inventive concept. However, one skilled in the art would understand that various embodiments may be practiced without such specific details.

As also will be appreciated by one skilled in the art, the exemplary embodiments may be embodied in a network device, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for monitoring a Physical Downlink Control Channel (PDCCH) for adaptive retransmission grants in a radio communication system, the method comprising:
   monitoring by a user equipment (UE), the PDCCH for adaptive retransmission grants;
   receiving by the UE, a hybrid automatic repeat request (HARQ) acknowledge (ACK) message;
   receiving, by the UE, a Medium Access Control (MAC) control element (CE); and
   entering, by the UE, a reduced power sleep mode after receiving the HARQ ACK message based on the received MAC CE.

2. The method of claim 1, further comprising at least one of:
   (a) ceasing to monitor the PDCCH for adaptive retransmission grants except during time periods which are aligned with subsequent Active Times,
   (b) ceasing to monitor the PDCCH for adaptive retransmission grants except during time periods which are aligned to PHICH feedback occasions, and
   (c) ceasing to monitor the PDCCH for adaptive retransmission grants at all.

3. The method of claim 1, further comprising:
   maintaining data in an HARQ buffer when the PDCCH is not monitored by the UE for adaptive retransmission grants.

4. The method of claim 1, further comprising:
selectively ceasing, by the UE, to monitor the PDCCH for adaptive retransmission grants after receipt of the HARQ ACK message based on information associated with radio quality.

5. The method of claim 4, wherein the information can be at least one of a physical layer channel quality indicator or radio resource control layer cell measurements.

6. A method for monitoring a Physical Downlink Control Channel (PDCCH) for adaptive retransmission grants in a radio communication system, the method comprising:
monitoring by a user equipment (UE), the PDCCH for adaptive retransmission grants;
receiving by the UE, a hybrid automatic repeat request (HAW) acknowledge (ACK) message;
receiving, by the UE, an adaptive retransmission grant control message which instructs the UE that the UE does not need to monitor the PDCCH for adaptive retransmission grants after receipt of an HARQ ACK message; and
ceasing by the UE, to monitor the PDCCH for adaptive retransmission grants based on receipt of the adaptive retransmission grant control message.

7. The method of claim 6, wherein the steps of monitoring, by the user equipment (UE), the PDCCH for adaptive retransmission grants, receiving, by the UE, the hybrid automatic repeat request (HARQ) acknowledge (ACK) message, and ceasing, by the UE, to monitor the PDCCH for adaptive retransmission grants after receipt of the HARQ ACK message are selectively performed based on at least one of transport block sizes, logical channels and radio link control.

8. A user equipment (UE) for monitoring a Physical Downlink Control Channel (PDCCH) for adaptive retransmission grants in a radio communication system, the UE comprising:
a processing circuitry configured to monitor the PDCCH for adaptive retransmission grants; and
a radio circuitry configured to receive a hybrid automatic repeat request (HARD) acknowledge (ACK) message;
wherein the radio circuitry is configured to receive a Medium Access Control (MAC) control element (CE), and
wherein the processing circuitry is configured to enter the UE into a reduced power sleep mode after receiving the HARQ ACK message based on the received MAC CE.

9. The UE of claim 8, wherein the processing circuitry is configured to perform at least one of:
(a) ceasing to monitor the PDCCH for adaptive retransmission grants except during time periods which are aligned with subsequent Active Times,
(b) ceasing to monitor the PDCCH for adaptive retransmission grants except during time periods which are aligned to PHICH feedback occasions, and
(c) ceasing to monitor the PDCCH for adaptive retransmission grants at all.

10. The UE of claim 8, further comprising:
a memory configured to maintain data in an HARQ buffer when the PDCCH is not monitored by the UE for adaptive retransmission grants.

11. The UE of claim 10, wherein the HARQ buffer is cleared from the memory in response to the UE permanently ceasing to monitor the PDCCH for adaptive retransmission grants.

12. The UE of claim 8, wherein:
the processing circuitry is configured to selectively apply a decision to cease monitoring the PDCCH for adaptive retransmission grants after receipt of the HARQ ACK message based on information associated with radio quality.

13. The UE of claim 12, wherein the information is at least one of a physical layer channel quality indicator or radio resource control layer cell measurements.

14. A user equipment (UE) for monitoring a Physical Downlink Control Channel (PDCCH) for adaptive retransmission grants in a radio communication system, the UE comprising:
a processing circuitry configured to monitor the PDCCH for adaptive retransmission grants; and
a radio circuitry configured to receive a hybrid automatic repeat request (HARQ) acknowledge (ACK) message,
wherein the radio circuitry is configured to receive an adaptive retransmission grant control message which instructs the UE that the UE does not need to monitor the PDCCH for adaptive retransmission grants after receipt of an HARQ ACK message, and
wherein the processing circuitry is configured to cease monitoring the PDCCH for adaptive retransmission grants based on receipt of the adaptive retransmission grant control message.

15. The UE of claim 14, wherein:
the processing circuitry configured to monitor the PDCCH for adaptive retransmission grants, the radio circuitry configured to receive a hybrid automatic repeat request (HARQ) acknowledge (ACK) message, and the processing circuitry configured to cease monitoring the PDCCH for adaptive retransmission grants after receipt of the HARQ ACK message are selectively performed based on at least one of transport block sizes, logical channels and radio link control.

16. A method for monitoring a Physical Downlink Control Channel (PDCCH) for adaptive retransmission grants in a radio communication system, the method comprising:
transmitting by an network node, a message which instructs a user equipment to cease monitoring the PDCCH after receipt of a hybrid automatic repeat request (HARQ) acknowledge (ACK) message; and
transmitting, by the network node, a Medium Access Control (MAC) control element (CE) as the message which allows a UE to enter a reduced power sleep mode after the UE receives the HARQ ACK message based on the transmitted MAC CE.

17. The method of claim 16, wherein the message instructs the user equipment to perform at least one of:
(a) ceasing to monitor the PDCCH for adaptive retransmission grants except during time periods which are aligned with subsequent Active Times,
(b) ceasing to monitor the PDCCH for adaptive retransmission grants except during time periods which are aligned to PHICH feedback occasions, and
(c) ceasing to monitor the PDCCH for adaptive retransmission grants at all.

18. The method of claim 16, further comprising:
transmitting instructions to selectively apply a decision to cease monitoring the PDCCH for adaptive retransmission grants after receipt of the HARQ ACK message based on information associated with radio quality, wherein the information is at least one of a physical layer channel quality indicator or radio resource control layer cell measurements.

19. The method of claim 16, further comprising:
transmitting instructions to selectively apply ceasing to monitor the PDCCH for adaptive retransmission grants after receipt of the HARQ ACK message based on at least one of transport block sizes, logical channels, and radio link control.

20. The method of claim 16, wherein the network node is an eNodeB.

21. A method for monitoring a Physical Downlink Control Channel (PDCCH) for adaptive retransmission grants in a radio communication system, the method comprising:
   transmitting by an network node, a message which instructs a user equipment to cease monitoring the PDCCH after receipt of a hybrid automatic repeat request (HARQ) acknowledge (ACK) message; and
   transmitting as the message, by the network node, an adaptive retransmission grant control message which instructs the UE that the UE does not need to monitor the PDCCH for adaptive retransmission grants after receipt of an HARQ ACK message.

22. A network node for monitoring a Physical Downlink Control Channel (PDCCH) for adaptive retransmission grants in a radio communication system, the network node comprising:
   a radio circuitry configured to transmit messages; and
   processor circuitry configured to transmit a message through the radio circuitry which instructs a user equipment to cease monitoring the PDCCH after receipt of a hybrid automatic repeat request (HARQ) acknowledge (ACK) message,
   wherein the processor circuitry is further configured to transmit as the message a Medium Access Control (MAC) control element (CE), which allows a UE to enter a reduced power sleep mode after the UE receives the HARQ ACK message, based on the transmitted MAC CE.

23. The network node of claim 22, wherein the message instructs the user equipment to perform at least one of:
   (a) ceasing to monitor the PDCCH for adaptive retransmission grants except during time periods which are aligned with subsequent Active Times,
   (b) ceasing to monitor the PDCCH for adaptive retransmission grants except during time periods which are aligned to PHICH feedback occasions, and
   (c) ceasing to monitor the PDCCH for adaptive retransmission grants at all.

24. The network node of claim 22, wherein the network node is an eNodeB.

25. A network node for monitoring a Physical Downlink Control Channel (PDCCH) for adaptive retransmission grants in a radio communication system, the network node comprising:
   a radio circuitry configured to transmit a message which instructs a user equipment to cease monitoring the PDCCH after receipt of a hybrid automatic repeat request (HARQ) acknowledge (ACK) message,
   wherein the radio circuitry is configured to transmit as the message an adaptive retransmission grant control message which instructs a UE that the UE does not need to monitor the PDCCH for adaptive retransmission grants after receipt of an HARQ ACK message.

26. The network node of claim 25, wherein:
   the radio circuitry is configured to transmit instructions to selectively apply a decision to cease monitoring the PDCCH for adaptive retransmission grants after receipt of the HARQ ACK message based on information associated with radio quality, wherein the information is at least one of a physical layer channel quality indicator or radio resource control layer cell measurements.

27. The network node of claim 25, wherein:
   the radio circuitry is configured to transmit instructions to selectively apply ceasing to monitor the PDCCH for adaptive retransmission grants after receipt of the HARQ ACK message based on at least one of transport block sizes, logical channels and radio link control.

* * * * *

UNITED STATES PATENT AND TRADEMARK OFFICE
CERTIFICATE OF CORRECTION

PATENT NO. : 9,019,882 B2  
APPLICATION NO. : 13/825462  
DATED : April 28, 2015  
INVENTOR(S) : Bergquist et al.

Page 1 of 2

It is certified that error appears in the above-identified patent and that said Letters Patent is hereby corrected as shown below:

Drawings

In Fig. 10, Sheet 10 of 15, delete "  "

and insert --  --, therefor.

Specification

In Column 4, Line 3, delete "(CCH)" and insert -- (CCCH) --, therefor.

In Column 19, Line 35, delete "an network" and insert -- a network --, therefor.

Claims

In Column 21, Line 15, in Claim 6, delete "(HAW)" and insert -- (HARQ) --, therefor.

In Column 21, Line 37, in Claim 8, delete "(HARD)" and insert -- (HARQ) --, therefor.

Signed and Sealed this  
First Day of March, 2016

Michelle K. Lee  
*Director of the United States Patent and Trademark Office*

Claims

In Column 22, Line 35, in Claim 16, delete "an network" and insert -- a network --, therefor.

In Column 23, Line 6, in Claim 21, delete "an network" and insert -- a network --, therefor.